(12) United States Patent
Laramie et al.

(10) Patent No.: US 11,923,495 B2
(45) Date of Patent: Mar. 5, 2024

(54) APPLICATION OF PRESSURE TO ELECTROCHEMICAL DEVICES INCLUDING DEFORMABLE SOLIDS, AND RELATED SYSTEMS

(71) Applicant: Sion Power Corporation, Tucson, AZ (US)

(72) Inventors: Michael G. Laramie, Tucson, AZ (US); Glenn Alan Hamblin, Tucson, AZ (US); Shane Harrel, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 0 days.

(21) Appl. No.: 17/911,080

(22) PCT Filed: Mar. 12, 2021

(86) PCT No.: PCT/US2021/022070
§ 371 (c)(1),
(2) Date: Sep. 12, 2022

(87) PCT Pub. No.: WO2021/183858
PCT Pub. Date: Sep. 16, 2021

(65) Prior Publication Data
US 2023/0118071 A1    Apr. 20, 2023

Related U.S. Application Data

(60) Provisional application No. 62/989,009, filed on Mar. 13, 2020.

(51) Int. Cl.
*H01M 10/04* (2006.01)
*H01M 10/052* (2010.01)
(Continued)

(52) U.S. Cl.
CPC ..... *H01M 10/0481* (2013.01); *H01M 10/052* (2013.01); *H01M 10/0585* (2013.01);
(Continued)

(58) Field of Classification Search
None
See application file for complete search history.

(56) References Cited

U.S. PATENT DOCUMENTS

| | | | |
|---|---|---|---|
| 1,956,243 | A | 4/1934 | McEachron et al. |
| 4,063,005 | A | 12/1977 | Mamantov et al. |

(Continued)

FOREIGN PATENT DOCUMENTS

| | | |
|---|---|---|
| CA | 2332452 A1 | 11/1999 |
| CA | 2532270 A1 | 11/1999 |

(Continued)

OTHER PUBLICATIONS

International Search Report and Written Opinion for International Application No. PCT/US2021/022070 dated May 26, 2021.
(Continued)

*Primary Examiner* — Robert S Carrico
(74) *Attorney, Agent, or Firm* — Wolf, Greenfield & Sacks, P.C.

(57) ABSTRACT

Systems and methods for applying pressure to electrochemical devices are generally described. In some aspects, batteries including an electrochemical cell and an associated deformable solid are provided. The deformable solid may be configured to apply an anisotropic force (e.g., during cycling), which may improve the performance and/or durability of the electrochemical cell. In some instances (for example, in certain cases where the deformable solid includes a piezoelectric array and/or an electroactive polymer), the battery may be able to make dynamic adjustments to a pressure experienced by the electrochemical cell (e.g.,
(Continued)

based on signals from a pressure sensor). The systems and methods described herein can, in some instances, provide for relatively uniform pressure distributions across an electrochemical cell and/or throughout a stack of multiple electrochemical cells.

32 Claims, 13 Drawing Sheets

(51) Int. Cl.
*H01M 10/0585* (2010.01)
*H01M 10/42* (2006.01)
*H01M 10/44* (2006.01)
*H01M 10/48* (2006.01)

(52) U.S. Cl.
CPC ......... *H01M 10/425* (2013.01); *H01M 10/44* (2013.01); *H01M 10/48* (2013.01)

(56) References Cited

U.S. PATENT DOCUMENTS

| | | |
|---|---|---|
| 4,384,029 A | 5/1983 | Kordesch et al. |
| 4,410,609 A | 10/1983 | Peled et al. |
| 4,477,545 A | 10/1984 | Akridge et al. |
| 4,664,991 A | 5/1987 | Perichaud et al. |
| 4,683,178 A | 7/1987 | Stadnick et al. |
| 4,739,018 A | 4/1988 | Armand et al. |
| 4,833,048 A | 5/1989 | Dejonghe et al. |
| 4,917,974 A | 4/1990 | De Jonghe et al. |
| 4,935,317 A | 6/1990 | Fauteux et al. |
| 5,090,296 A | 2/1992 | Todd |
| 5,114,804 A | 5/1992 | Stiles et al. |
| 5,162,175 A | 11/1992 | Visco et al. |
| 5,194,341 A | 3/1993 | Bagley et al. |
| 5,324,599 A | 6/1994 | Oyama et al. |
| 5,441,831 A | 8/1995 | Okamoto et al. |
| 5,472,808 A | 12/1995 | Peled et al. |
| 5,510,209 A | 4/1996 | Abraham et al. |
| 5,514,155 A | 5/1996 | Daneshvar |
| 5,516,598 A | 5/1996 | Visco et al. |
| 5,529,860 A | 6/1996 | Skotheim et al. |
| 5,582,623 A | 12/1996 | Chu |
| 5,601,947 A | 2/1997 | Skotheim et al. |
| 5,648,187 A | 7/1997 | Skotheim |
| 5,690,702 A | 11/1997 | Skotheim et al. |
| 5,723,230 A | 3/1998 | Naoi et al. |
| 5,783,330 A | 7/1998 | Naoi et al. |
| 5,792,575 A | 8/1998 | Naoi et al. |
| 5,800,939 A | 9/1998 | Mishina et al. |
| 5,834,135 A | 11/1998 | Pendalwar et al. |
| 5,882,819 A | 3/1999 | Naoi et al. |
| 5,919,587 A | 7/1999 | Mukherjee et al. |
| 5,961,672 A | 10/1999 | Skotheim et al. |
| 6,030,720 A | 2/2000 | Chu et al. |
| 6,117,583 A | 9/2000 | Nilsson et al. |
| 6,117,590 A | 9/2000 | Skotheim et al. |
| 6,120,930 A | 9/2000 | Rouillard et al. |
| 6,143,216 A | 11/2000 | Loch et al. |
| 6,143,446 A | 11/2000 | Davis et al. |
| 6,153,337 A | 11/2000 | Carlson et al. |
| 6,165,645 A | 12/2000 | Nishimura et al. |
| 6,201,100 B1 | 3/2001 | Gorkovenko et al. |
| 6,203,947 B1 | 3/2001 | Peled et al. |
| 6,238,819 B1 | 5/2001 | Cahill et al. |
| 6,238,821 B1 | 5/2001 | Mukherjee et al. |
| 6,245,455 B1 | 6/2001 | Kohno et al. |
| 6,268,087 B1 | 7/2001 | Kim et al. |
| 6,306,545 B1 | 10/2001 | Carlson et al. |
| 6,365,032 B1 | 4/2002 | Shiepe et al. |
| 6,391,069 B1 | 5/2002 | Gozdz et al. |
| 6,413,667 B1 | 7/2002 | Gozdz |
| 6,468,692 B1 | 10/2002 | Nemoto et al. |
| 6,558,438 B1 | 5/2003 | Satoh et al. |
| 6,585,869 B2 | 7/2003 | Shiepe et al. |
| 6,664,006 B1 | 12/2003 | Munshi |
| 6,682,853 B2 | 1/2004 | Kimijima et al. |
| 6,689,177 B2 | 2/2004 | Sugiyama et al. |
| 6,733,924 B1 | 5/2004 | Skotheim et al. |
| 6,797,428 B1 | 9/2004 | Skotheim et al. |
| 6,806,001 B1 | 10/2004 | Benczur-Uermoessy et al. |
| 6,819,082 B2 | 11/2004 | Yang |
| 6,844,110 B2 | 1/2005 | Enomoto et al. |
| 6,936,381 B2 | 8/2005 | Skotheim et al. |
| 6,951,699 B2 | 10/2005 | Yata et al. |
| 7,087,344 B2 | 8/2006 | Kaneta |
| 7,235,330 B1 | 6/2007 | Fujimoto et al. |
| 7,244,530 B2 | 7/2007 | Hambitzer et al. |
| 7,247,408 B2 | 7/2007 | Skotheim et al. |
| 7,252,689 B2 | 8/2007 | Fujino et al. |
| 7,354,675 B2 | 4/2008 | Molter |
| 7,642,001 B2 | 1/2010 | Yata et al. |
| 7,688,075 B2 | 3/2010 | Kelley et al. |
| 7,691,530 B2 | 4/2010 | Kim et al. |
| 7,736,800 B2 | 6/2010 | Lee |
| 7,749,655 B2 | 7/2010 | Doh et al. |
| 7,771,870 B2 | 8/2010 | Affinito et al. |
| 7,785,730 B2 | 8/2010 | Affinito et al. |
| 7,842,418 B2 | 11/2010 | Miyahisa et al. |
| 7,939,198 B2 | 5/2011 | Mukherjee et al. |
| 8,066,913 B2 | 11/2011 | Kikuya et al. |
| 8,076,024 B2 | 12/2011 | Affinito et al. |
| 8,084,102 B2 | 12/2011 | Affinito |
| 8,087,309 B2 | 1/2012 | Kelley et al. |
| 8,105,717 B2 | 1/2012 | Skotheim et al. |
| 8,129,048 B2 | 3/2012 | Hirakawa et al. |
| 8,158,278 B2 | 4/2012 | Tsutsumi et al. |
| 8,163,409 B2 | 4/2012 | Fujikawa et al. |
| 8,197,971 B2 | 6/2012 | Skotheim et al. |
| 8,264,205 B2 | 9/2012 | Kopera |
| 8,338,034 B2 | 12/2012 | Affinito et al. |
| 8,415,054 B2 | 4/2013 | Skotheim et al. |
| 8,415,071 B2 | 4/2013 | Tanaka et al. |
| 8,603,680 B2 | 12/2013 | Affinito et al. |
| 8,617,748 B2 | 12/2013 | Mikhaylik et al. |
| 8,623,557 B2 | 1/2014 | Skotheim et al. |
| 8,728,661 B2 | 5/2014 | Skotheim et al. |
| 8,753,771 B2 | 6/2014 | Skotheim et al. |
| 8,871,387 B2 | 10/2014 | Wang et al. |
| 8,916,284 B2 | 12/2014 | Jang et al. |
| 8,936,870 B2 | 1/2015 | Affinito et al. |
| 8,968,928 B2 | 3/2015 | Wang et al. |
| 9,005,311 B2 | 4/2015 | Safont-Sempere et al. |
| 9,005,809 B2 | 4/2015 | Wilkening et al. |
| 9,012,049 B2 | 4/2015 | Fetzer et al. |
| 9,034,421 B2 | 5/2015 | Mikhaylik et al. |
| 9,040,197 B2 | 5/2015 | Affinito et al. |
| 9,040,201 B2 | 5/2015 | Affinito et al. |
| 9,065,149 B2 | 6/2015 | Skotheim et al. |
| 9,077,041 B2 | 7/2015 | Burnside et al. |
| 9,105,938 B2 | 8/2015 | Scordilis-Kelley et al. |
| 9,118,085 B2 | 8/2015 | Ikeda |
| 9,177,689 B2 | 11/2015 | Paulsen et al. |
| 9,209,428 B2 | 12/2015 | Jung et al. |
| 9,214,678 B2 | 12/2015 | Mikhaylik |
| 9,219,268 B2 | 12/2015 | Guen et al. |
| 9,287,540 B2 | 3/2016 | Huang |
| 9,287,551 B2 | 3/2016 | Kang et al. |
| 9,306,197 B2 | 4/2016 | Byun et al. |
| 9,306,252 B2 | 4/2016 | Kristofek et al. |
| 9,391,344 B2 | 7/2016 | Kwon et al. |
| 9,397,342 B2 | 7/2016 | Skotheim et al. |
| 9,399,404 B2 | 7/2016 | Ose et al. |
| 9,419,274 B2 | 8/2016 | Wilkening et al. |
| 9,490,478 B2 | 11/2016 | Mikhaylik et al. |
| 9,531,009 B2 | 12/2016 | Kumaresan et al. |
| 9,548,492 B2 | 1/2017 | Affinito et al. |
| 9,559,348 B2 | 1/2017 | Kumaresan et al. |
| 9,577,243 B2 | 2/2017 | Schmidt et al. |
| 9,577,267 B2 | 2/2017 | Scordilis-Kelley et al. |
| 9,653,735 B2 | 5/2017 | Skotheim et al. |
| 9,653,750 B2 | 5/2017 | Laramie et al. |
| 9,673,474 B2 | 6/2017 | Nakaishi |

(56) References Cited

U.S. PATENT DOCUMENTS

| | | |
|---|---|---|
| 9,711,784 B2 | 7/2017 | Kelley et al. |
| 9,728,768 B2 | 8/2017 | Mikhaylik et al. |
| 9,735,411 B2 | 8/2017 | Viner et al. |
| 9,755,268 B2 | 9/2017 | Fleischmann et al. |
| 9,780,404 B2 | 10/2017 | Scordilis-Kelley et al. |
| 9,825,328 B2 | 11/2017 | Du et al. |
| 9,853,271 B2 | 12/2017 | Iwase et al. |
| 9,853,287 B2 | 12/2017 | Mikhaylik et al. |
| 9,947,963 B2 | 4/2018 | Du et al. |
| 9,994,959 B2 | 6/2018 | Laramie et al. |
| 9,994,960 B2 | 6/2018 | Laramie et al. |
| 10,020,479 B2 | 7/2018 | Mikhaylik et al. |
| 10,020,512 B2 | 7/2018 | Gronwald et al. |
| 10,050,308 B2 | 8/2018 | Liao et al. |
| 10,069,135 B2 | 9/2018 | Fleischmann et al. |
| 10,069,146 B2 | 9/2018 | Skotheim et al. |
| 10,122,043 B2 | 11/2018 | Du et al. |
| 10,243,202 B2 | 3/2019 | Fleischmann et al. |
| 10,312,545 B2 | 6/2019 | Scordilis-Kelley et al. |
| 10,319,988 B2 | 6/2019 | Kelley et al. |
| 10,320,027 B2 | 6/2019 | Scordilis-Kelley et al. |
| 10,320,031 B2 | 6/2019 | Mikhaylik et al. |
| 10,333,134 B2 | 6/2019 | Mikhaylik et al. |
| 10,333,149 B2 | 6/2019 | Affinito et al. |
| 10,388,987 B2 | 8/2019 | Du et al. |
| 10,461,333 B2 | 10/2019 | Mikhaylik et al. |
| 10,461,372 B2 | 10/2019 | Laramie et al. |
| 10,490,796 B2 | 11/2019 | Laramie et al. |
| 10,535,902 B2 | 1/2020 | Laramie et al. |
| 10,541,448 B2 | 1/2020 | Mikhaylik et al. |
| 10,553,893 B2 | 2/2020 | Laramie et al. |
| 10,573,869 B2 | 2/2020 | Mikhaylik et al. |
| 10,608,278 B2 | 3/2020 | Liao et al. |
| 10,629,947 B2 | 4/2020 | Affinito et al. |
| 10,629,954 B2 | 4/2020 | Mikhaylik et al. |
| 10,720,648 B2 | 7/2020 | Quero-Mieres et al. |
| 10,847,833 B2 | 11/2020 | Bunte et al. |
| 10,862,105 B2 | 12/2020 | Gronwald et al. |
| 10,868,306 B2 | 12/2020 | Mudalige et al. |
| 10,879,527 B2 | 12/2020 | Laramie et al. |
| 10,944,094 B2 | 3/2021 | Liao et al. |
| 10,965,130 B2 | 3/2021 | Mikhaylik et al. |
| 10,991,925 B2 | 4/2021 | Wang et al. |
| 11,024,923 B2 | 6/2021 | Liao et al. |
| 11,038,178 B2 | 6/2021 | Liao et al. |
| 11,041,248 B2 | 6/2021 | Laramie et al. |
| 11,056,728 B2 | 7/2021 | Mikhaylik et al. |
| 11,088,395 B2 | 8/2021 | Mikhaylik et al. |
| 11,108,076 B2 | 8/2021 | Scordilis-Kelley et al. |
| 11,108,077 B2 | 8/2021 | Scordilis-Kelley et al. |
| 11,121,397 B2 | 9/2021 | Scordilis-Kelley et al. |
| 11,165,122 B2 | 11/2021 | Laramie et al. |
| 11,183,690 B2 | 11/2021 | Wang et al. |
| 11,228,055 B2 | 1/2022 | Liao et al. |
| 11,233,243 B2 | 1/2022 | Affinito et al. |
| 11,239,504 B2 | 2/2022 | Laramie et al. |
| 11,245,103 B2 | 2/2022 | Mikhaylik et al. |
| 11,251,501 B2 | 2/2022 | Schneider et al. |
| 11,316,204 B2 | 4/2022 | Mikhaylik et al. |
| 11,322,804 B2 | 5/2022 | Laramie et al. |
| 11,367,892 B2 | 6/2022 | Laramie et al. |
| 11,424,492 B2 | 8/2022 | Mikhaylik et al. |
| 11,456,459 B2 | 9/2022 | Affinito et al. |
| 2001/0000485 A1 | 4/2001 | Ying et al. |
| 2001/0005561 A1 | 6/2001 | Yamada et al. |
| 2001/0041294 A1 | 11/2001 | Chu et al. |
| 2002/0012846 A1 | 1/2002 | Skotheim et al. |
| 2002/0192557 A1 | 12/2002 | Choi et al. |
| 2003/0113624 A1 | 6/2003 | Kim et al. |
| 2003/0124416 A1 | 7/2003 | Kaneta |
| 2004/0081887 A1 | 4/2004 | Sugiyama et al. |
| 2005/0042515 A1 | 2/2005 | Hwang et al. |
| 2005/0130041 A1 | 6/2005 | Fensore |
| 2005/0175903 A1 | 8/2005 | Kim et al. |
| 2005/0196672 A1 | 9/2005 | Mukherjee et al. |
| 2006/0024579 A1 | 2/2006 | Kolosnitsyn et al. |
| 2006/0115579 A1 | 6/2006 | Mukherjee et al. |
| 2006/0115735 A1 | 6/2006 | Yasuda et al. |
| 2006/0234117 A1 | 10/2006 | Fujikawa et al. |
| 2006/0238203 A1 | 10/2006 | Kelley et al. |
| 2007/0141449 A1 | 6/2007 | Kim |
| 2007/0221265 A1 | 9/2007 | Affinito et al. |
| 2007/0224502 A1 | 9/2007 | Affinito et al. |
| 2008/0187663 A1 | 8/2008 | Affinito |
| 2008/0213672 A1 | 9/2008 | Skotheim et al. |
| 2008/0318128 A1 | 12/2008 | Simoneau et al. |
| 2009/0035646 A1 | 2/2009 | Mikhaylik et al. |
| 2009/0055110 A1 | 2/2009 | Kelley et al. |
| 2009/0077794 A1 | 3/2009 | Hirakawa et al. |
| 2009/0200986 A1 | 8/2009 | Kopera et al. |
| 2010/0035128 A1 | 2/2010 | Scordilis-Kelley et al. |
| 2010/0129699 A1 | 5/2010 | Mikhaylik et al. |
| 2010/0143823 A1 | 6/2010 | Tanaka et al. |
| 2010/0203370 A1 | 8/2010 | Pozin et al. |
| 2010/0239914 A1 | 9/2010 | Mikhaylik et al. |
| 2010/0263181 A1 | 10/2010 | Rosenthal et al. |
| 2010/0285360 A1 | 11/2010 | Kozinsky et al. |
| 2011/0006738 A1 | 1/2011 | Mikhaylik et al. |
| 2011/0014524 A1 | 1/2011 | Skotheim et al. |
| 2011/0059361 A1 | 3/2011 | Wilkening et al. |
| 2011/0068001 A1 | 3/2011 | Affinito et al. |
| 2011/0070491 A1 | 3/2011 | Campbell et al. |
| 2011/0070494 A1 | 3/2011 | Campbell et al. |
| 2011/0076560 A1 | 3/2011 | Scordilis-Kelley et al. |
| 2011/0159376 A1 | 6/2011 | Skotheim et al. |
| 2011/0165471 A9 | 7/2011 | Skotheim et al. |
| 2011/0177398 A1 | 7/2011 | Affinito et al. |
| 2011/0206992 A1 | 8/2011 | Campbell et al. |
| 2011/0250485 A1 | 10/2011 | Tsukuda |
| 2011/0256450 A1 | 10/2011 | Campbell et al. |
| 2012/0048729 A1 | 3/2012 | Mikhaylik et al. |
| 2012/0052339 A1 | 3/2012 | Mikhaylik et al. |
| 2012/0070746 A1 | 3/2012 | Mikhaylik et al. |
| 2012/0082872 A1 | 4/2012 | Schmidt et al. |
| 2012/0082901 A1 | 4/2012 | Schmidt et al. |
| 2012/0189879 A1 | 7/2012 | Fetzer et al. |
| 2013/0017441 A1 | 1/2013 | Affinito et al. |
| 2013/0095380 A1 | 4/2013 | Affinito et al. |
| 2013/0216915 A1 | 8/2013 | Affinito et al. |
| 2013/0316072 A1 | 11/2013 | Scordilis-Kelley et al. |
| 2014/0272594 A1 | 9/2014 | Safont Sempere et al. |
| 2014/0272595 A1 | 9/2014 | Cristadoro et al. |
| 2015/0129332 A1 | 5/2015 | Seto et al. |
| 2015/0162586 A1 | 6/2015 | Fleischmann et al. |
| 2015/0180084 A1 | 6/2015 | Scordilis-Kelley et al. |
| 2015/0188194 A1 | 7/2015 | Mikhaylik et al. |
| 2015/0287986 A1 | 10/2015 | Affinito et al. |
| 2016/0118638 A1 | 4/2016 | Gronwald et al. |
| 2016/0118651 A1 | 4/2016 | Kovalev et al. |
| 2016/0126541 A1 | 5/2016 | Goto et al. |
| 2016/0218398 A1 | 7/2016 | Yonehara et al. |
| 2017/0047590 A1 | 2/2017 | Mikhaylik et al. |
| 2017/0141385 A1 | 5/2017 | Scordilis-Kelley et al. |
| 2017/0141402 A1 | 5/2017 | Affinito et al. |
| 2017/0288208 A1 | 10/2017 | Kelley et al. |
| 2018/0006303 A1 | 1/2018 | Mikhaylik et al. |
| 2018/0048018 A1 | 2/2018 | Scordilis-Kelley et al. |
| 2018/0123121 A1 | 5/2018 | Buchkremer et al. |
| 2018/0254516 A1 | 9/2018 | Han et al. |
| 2018/0261820 A1 | 9/2018 | Liao et al. |
| 2018/0269520 A1 | 9/2018 | Scordilis-Kelley et al. |
| 2018/0301697 A1 | 10/2018 | Affinito et al. |
| 2018/0375155 A1 | 12/2018 | Liao et al. |
| 2019/0006699 A1 | 1/2019 | Jones et al. |
| 2019/0088958 A1 | 3/2019 | Viner et al. |
| 2019/0229323 A1 | 7/2019 | Mikhaylik et al. |
| 2019/0386334 A1 | 12/2019 | Scordilis-Kelley et al. |
| 2020/0044460 A1 | 2/2020 | Mikhaylik et al. |
| 2020/0091547 A1 | 3/2020 | Scordilis-Kelley et al. |
| 2020/0168959 A1* | 5/2020 | Hettrich ............ H01M 10/052 |
| 2020/0220149 A1 | 7/2020 | Laramie et al. |
| 2020/0220197 A1 | 7/2020 | Laramie et al. |
| 2020/0220205 A1 | 7/2020 | Affinito et al. |
| 2020/0313225 A1 | 10/2020 | Scordilis-Kelley et al. |

(56) References Cited

U.S. PATENT DOCUMENTS

| | | |
|---|---|---|
| 2020/0373551 A1 | 11/2020 | Milobar et al. |
| 2020/0373578 A1 | 11/2020 | Wang et al. |
| 2020/0395585 A1 | 12/2020 | Laramie et al. |
| 2020/0411916 A1 | 12/2020 | Nam et al. |
| 2021/0057753 A1 | 2/2021 | Viner et al. |
| 2021/0135192 A1 | 5/2021 | Gronwald et al. |
| 2021/0135205 A1 | 5/2021 | Laramie et al. |
| 2021/0138673 A1 | 5/2021 | Shannon et al. |
| 2021/0151815 A1 | 5/2021 | Milobar et al. |
| 2021/0151816 A1 | 5/2021 | Shayan et al. |
| 2021/0151817 A1 | 5/2021 | Jennings et al. |
| 2021/0151830 A1 | 5/2021 | Shayan et al. |
| 2021/0151839 A1 | 5/2021 | Niedzwiecki et al. |
| 2021/0151840 A1 | 5/2021 | Shayan et al. |
| 2021/0151841 A1 | 5/2021 | Johnson et al. |
| 2021/0193984 A1 | 6/2021 | Laramie et al. |
| 2021/0193985 A1 | 6/2021 | Laramie et al. |
| 2021/0193996 A1 | 6/2021 | Laramie et al. |
| 2021/0194069 A1 | 6/2021 | Hamblin et al. |
| 2021/0218243 A1 | 7/2021 | Hamblin et al. |
| 2021/0249651 A1 | 8/2021 | Laramie et al. |
| 2021/0265610 A1 | 8/2021 | Liao et al. |
| 2021/0328274 A1 | 10/2021 | Mikhaylik et al. |
| 2021/0408550 A1 | 12/2021 | Liao et al. |
| 2021/0408598 A1 | 12/2021 | Mikhaylik et al. |
| 2022/0029191 A1 | 1/2022 | Scordilis-Kelley et al. |
| 2022/0048121 A1 | 2/2022 | Child et al. |
| 2022/0069593 A1 | 3/2022 | Hamblin et al. |
| 2022/0109215 A1 | 4/2022 | Laramie et al. |
| 2022/0115649 A1 | 4/2022 | Kovalev et al. |
| 2022/0115704 A1 | 4/2022 | Mikhaylik et al. |
| 2022/0115705 A1 | 4/2022 | Kovalev et al. |
| 2022/0115715 A1 | 4/2022 | Kovalev et al. |
| 2022/0199968 A1 | 6/2022 | Child et al. |
| 2022/0209284 A1 | 6/2022 | Liao et al. |
| 2022/0209327 A1 | 6/2022 | Hamblin et al. |
| 2022/0255188 A1 | 8/2022 | Schneider et al. |
| 2022/0271537 A1 | 8/2022 | Mikhaylik et al. |
| 2022/0278354 A1 | 9/2022 | Laramie et al. |
| 2022/0278429 A1 | 9/2022 | Laramie et al. |

FOREIGN PATENT DOCUMENTS

| | | | |
|---|---|---|---|
| CA | 2310697 A1 | 12/2000 | |
| CA | 2404507 A1 | 10/2001 | |
| CN | 1121264 A | 4/1996 | |
| CN | 1430304 A | 7/2003 | |
| CN | 1874027 A | 12/2006 | |
| CN | 112331935 A * | 2/2021 | B60L 50/64 |
| EP | 0 700 109 A1 | 3/1996 | |
| EP | 1 144 730 B1 | 9/2002 | |
| EP | 1 171 387 B1 | 11/2005 | |
| EP | 0 700 109 B1 | 10/2006 | |
| EP | 1 717 879 A1 | 11/2006 | |
| EP | 1 059 681 B1 | 1/2007 | |
| EP | 1 194 976 B1 | 2/2007 | |
| EP | 1 768 202 A1 | 3/2007 | |
| EP | 0 851 522 B1 | 9/2009 | |
| EP | 1 137 091 B1 | 5/2011 | |
| EP | 1 137 093 B1 | 12/2011 | |
| EP | 1 083 618 B1 | 4/2013 | |
| EP | 2 104 163 B1 | 6/2014 | |
| EP | 2 471 140 B1 | 2/2015 | |
| EP | 3 051 621 A1 | 8/2016 | |
| EP | 2 713 432 B1 | 8/2017 | |
| EP | 2 144 312 B1 | 9/2017 | |
| JP | S58-164169 A | 9/1983 | |
| JP | H04-294071 A | 10/1992 | |
| JP | H06-124700 A | 5/1994 | |
| JP | H10-55823 A | 2/1998 | |
| JP | H10-214638 A | 8/1998 | |
| JP | H11-121045 A | 4/1999 | |
| JP | H11-219731 A | 8/1999 | |
| JP | 2000-268866 A | 9/2000 | |
| JP | 2000-268873 A | 9/2000 | |
| JP | 2001-093577 A | 4/2001 | |
| JP | 2001-143757 A | 5/2001 | |
| JP | 3261688 B2 | 3/2002 | |
| JP | 2003-297431 A | 10/2003 | |
| JP | 2003-303579 A | 10/2003 | |
| JP | 2004-213902 A | 7/2004 | |
| JP | 2004-319489 A | 11/2004 | |
| JP | 2005-056701 A | 3/2005 | |
| JP | 2005-063848 A | 3/2005 | |
| JP | 2005-353452 A | 12/2005 | |
| JP | 2006-310033 A | 11/2006 | |
| JP | 2006-310281 A | 11/2006 | |
| JP | 2006-313737 A | 11/2006 | |
| JP | 2006-318892 A | 11/2006 | |
| JP | 2007-257850 A | 10/2007 | |
| JP | 2009-076260 A | 4/2009 | |
| JP | 2009-104902 A | 5/2009 | |
| WO | WO 95/26055 A1 | 9/1995 | |
| WO | WO 99/05743 A1 | 2/1999 | |
| WO | WO 99/33125 A1 | 7/1999 | |
| WO | WO 99/33130 A1 | 7/1999 | |
| WO | WO 01/31722 A1 | 5/2001 | |
| WO | WO 01/039302 | 5/2001 | |
| WO | WO 02/095849 A2 | 11/2002 | |
| WO | WO 2007/075867 A2 | 7/2007 | |
| WO | WO 2007/097172 A1 | 8/2007 | |
| WO | WO 2009/017726 A1 | 2/2009 | |
| WO | WO 2009/042071 A2 | 4/2009 | |
| WO | WO 2009/054987 A1 | 4/2009 | |
| WO | WO 2009/089018 A2 | 7/2009 | |
| WO | WO 2012/174393 A1 | 12/2012 | |
| WO | WO 2020/139802 A2 | 7/2020 | |

OTHER PUBLICATIONS

International Preliminary Report on Patentability for International Application No. PCT/US2021/022070 dated Sep. 22, 2022.

[No Author Listed], Contractive EAP Actuator. YouTube. Jan. 19, 2009. https://www.youtube.com/watch?v=4ergyPGm5u4 [last accessed Sep. 23, 2022]. 5 pages.

[No Author Listed], Material Technology for Lithium Secondary Battery (I). Korea Institute of Science and Technology Information. 2004:p. 33.

[No Author Listed], Piezoceramic Actuators. NGK Insulators. https://www.ngk-insulators.com/en/product/microactuator.html [last accessed Sep. 23, 2022]. 5 pages.

Affinito et al., Increasing Li—S Battery Cycle Life, and Improving Safety, through Application of a Variety of Coating Techniques. Soc Vac Coat 54$^{th}$ Ann. 2011:589-92.

Chen et al., Recent advances in lithium-sulfur batteries. Journal of Power Sources. 2014;267:770-83. Epub Jun. 19, 2014.

Gireaud et al., Lithium metal stripping/plating mechanism studies: A metallurgical approach. Electrochemistry Communications. 2006;8:1639-49.

Hirai et al., Influence of electrolyte on lithium cycling efficiency with pressurized electrode stack. J. Electrochem. Soc. 1994;141:611-14.

Huggins, Lithium alloy negative electrodes. Journal of Power Sources. 1999;81-82:13-19.

Kim, Recent Developments in Anode Materials for Li Secondary Batteries. Journal of the Korean Electrochemical Society. 2008;11(3):211-22.

Psoma et al., Comparative Assessment of Different Sacrificial Materials for Releasing SU-8 Structures. Rev. Adv. Mater. Sci. 2005;10:149-55.

Schmaljohann et al., Thin film sensors for measuring small forces. J Sens Sens Syst. Feb. 23, 2015;4(1):91-5.

Shipman, New 'Bottlebrush' Electroactive Polymers Make Dielectric Elastomers Increasingly Viable for Use in Devices. Research and Innovation. NC State University. Nov. 9, 2016. https://news.ncsu.edu/2016/11/bottlebrush-2016/ [last accessed Sep. 23, 2022]. 4 pages.

Vatankhah-Varnoosfaderani et al., Bottlebrush Elastomers: A New Platform for Freestanding Electroactuation. Adv Mater. Jan. 2017;29(2):1604209. doi: 10.1002/adma.201604209. Epub Nov. 8, 2016.

(56) References Cited

OTHER PUBLICATIONS

Yang et al., Small particle size multiphase Li-alloy anodes for lithium-ion-batteries. Solid State Ionics. 1996;90:281-7.

* cited by examiner

APPLICATION OF PRESSURE TO ELECTROCHEMICAL DEVICES INCLUDING DEFORMABLE SOLIDS, AND RELATED SYSTEMS

RELATED APPLICATIONS

This application is a national stage filing under 35 U.S.C. § 371 of International Patent Application No. PCT/US2021/022070, filed Mar. 12, 2021, and entitled "Application of Pressure to Electrochemical Devices Including Deformable Solids, and Related Systems," which claims priority under 35 U.S.C. § 119(e) to U.S. Provisional Application No. 62/989,009, filed Mar. 13, 2020, and entitled "Application of Pressure to Electrochemical Devices Including Deformable Solids, and Related Systems," each of which is incorporated herein by reference in its entirety for all purposes.

TECHNICAL FIELD

Systems and methods for applying pressure to electrochemical devices are generally described.

BACKGROUND

Batteries typically include one or more cells that undergo electrochemical reactions to produce electric current. Applying a force to at least a portion of an electrochemical cell (e.g., during cycling of the cell) can improve the performance of the electrochemical cell. Certain embodiments of the present disclosure are directed to inventive articles, systems, and methods relating to the handling of compressive force in batteries.

SUMMARY

Systems and methods for applying pressure to electrochemical devices are generally described. In some aspects, batteries including an electrochemical cell and an associated deformable solid are provided. The deformable solid may be configured to apply an anisotropic force (e.g., during cycling), which may improve the performance and/or durability of the electrochemical cell. In some instances (for example, in certain cases where the deformable solid includes a piezoelectric array and/or an electroactive polymer), the battery may be able to make dynamic adjustments to a pressure experienced by the electrochemical cell (e.g., based on signals from a pressure sensor). The systems and methods described herein can, in some instances, provide for relatively uniform pressure distributions across an electrochemical cell and/or throughout a stack of multiple electrochemical cells. The subject matter of the present invention involves, in some cases, interrelated products, alternative solutions to a particular problem, and/or a plurality of different uses of one or more systems and/or articles.

In one aspect, a battery is provided. In some embodiments, the battery comprises an electrochemical cell and a deformable solid associated with the electrochemical cell, the deformable solid configured to apply an anisotropic force with a component normal to an active surface of an electrode of the electrochemical cell, wherein at least a portion of the deformable solid is configured to experience a mechanical stress affecting a magnitude of the anisotropic force upon the application of an electrical potential to the deformable solid.

In another aspect, methods are provided. In some embodiments, the method comprises applying an electrical potential to a deformable solid associated with an electrochemical cell such that at least a portion of the deformable solid experiences a mechanical stress and the at least a portion of the deformable solid applies a first anisotropic force with a component normal to an active surface of an electrode of the electrochemical cell, and changing the electrical potential applied to the deformable solid such that the mechanical stress experienced by the at least a portion of the deformable solid changes and the at least a portion of the deformable solid applies a second anisotropic force with a component normal to the active surface having a magnitude that is different than that of the first anisotropic force or is zero.

In some embodiments, the method comprises applying a first anisotropic force to a first region of a surface of an electrochemical cell based at least in part on a first electrical signal, the first anisotropic force having a component normal to the surface, and applying a second anisotropic force to a second region of the surface based at least in part on a second electrical signal, the second anisotropic force having a component normal to the surface.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
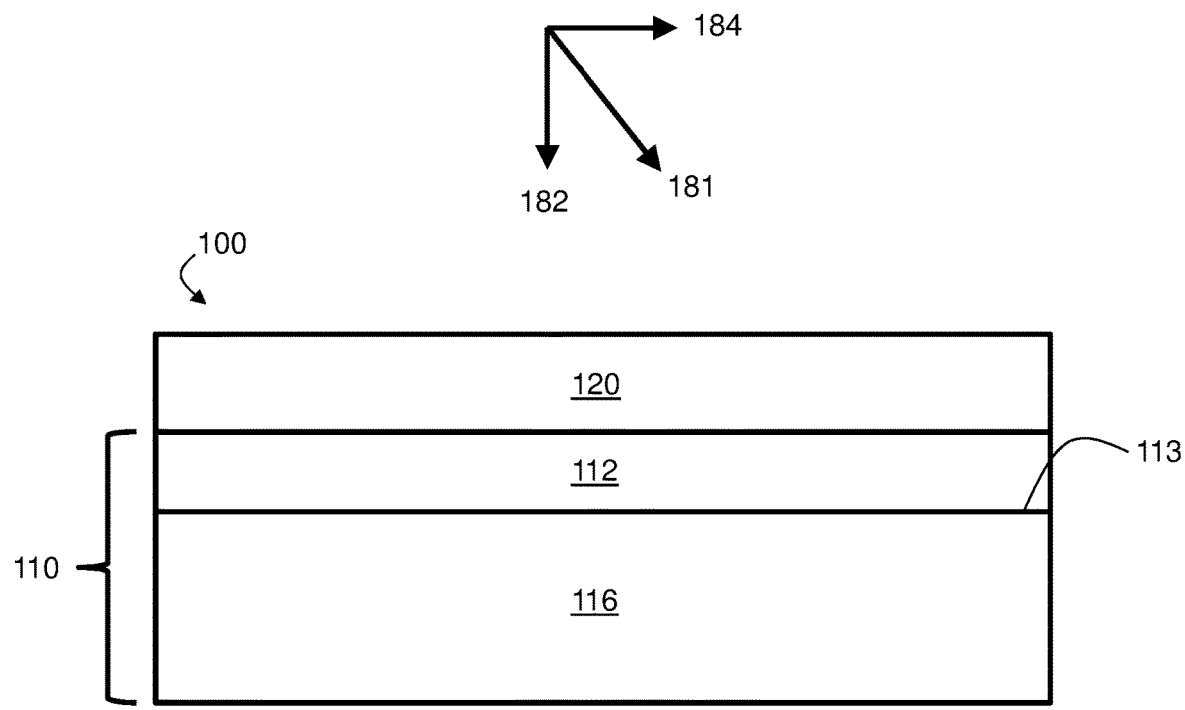
FIGS. 1A-1B show cross-sectional schematic diagrams of exemplary batteries comprising an electrochemical cell and a deformable solid, according to some embodiments.

Systems and methods for applying pressure to electrochemical devices are generally described. In some aspects, batteries including an electrochemical cell and an associated deformable solid are provided. The deformable solid may be configured to apply an anisotropic force (e.g., during cycling), which may improve the performance and/or durability of the electrochemical cell. In some instances (for example, in certain cases where the deformable solid includes a piezoelectric array and/or an electroactive polymer), the battery may be able to make dynamic adjustments to a pressure experienced by the electrochemical cell (e.g., based on signals from a pressure sensor). The systems and methods described herein can, in some instances, provide for relatively uniform pressure distributions across an electrochemical cell and/or throughout a stack of multiple electrochemical cells.

Certain of the systems and methods described herein may allow for a first anisotropic force to be applied by a deformable solid based on an applied electrical potential (e.g., from a battery control system), and for the electrical potential to then be changed (e.g., based on a change in battery conditions and/or a pressure sensor measurement) such that the deformable solid applies a second, different anisotropic force (e.g., based on a change in mechanical stress, such as in the case of a piezoelectric deformable solid). Such a process may allow for pressure compensation due to, for example, expansion and/or contraction of an electrochemical cell during cycling, or changes in external conditions.

Additionally, certain of the systems and methods described herein may provide for ways to controllably apply different forces at different regions of a surface of an electrochemical cell based on separate electrical signals. Such a process may, for example, be accomplished using a deformable solid comprising independently addressable deformable solid segments (e.g., a piezoelectric array). Applying different forces at different regions of an electrochemical cell may compensate for spatial variance in pressure experienced by an electrochemical cell upon application of force using certain existing techniques, such as via solid plates. The force may be applied such that the electrochemical cell experiences a relatively uniform pressure distribution (e.g., pressures within 5% at different regions of the surface).

In some cases, it may be beneficial to apply force to electrochemical cells in a battery. For example, in some cases applying an anisotropic force with a component normal to an active surface of an electrode of at least one of the electrochemical cells can improve performance during charging and/or discharging by reducing problems such as dendrite formation and surface roughening of the electrode while improving current density. One such example is the case where at least one of the electrochemical cells of the battery comprises lithium metal or a lithium metal alloy as an electrode active material during at least a portion of a charge/discharge cycle. Lithium metal may undergo dendrite growth, for example, which can in certain cases lead to failure of the electrochemical cell and safety hazards. Application of an anisotropic force to electrodes comprising lithium metal may mitigate lithium dendrite formation and other deleterious phenomena. However, it has been realized in the context of the present disclosure that numerous challenges may emerge when applying force within batteries comprising certain electrochemical cells, including when the battery comprises multiple electrochemical cells. For example, application of a relatively uniform force such that each of the electrochemical cells experiences a relatively similar pressure distribution can be important for performance and durability, and managing pressure on multiple cells must be accomplished simultaneously. Further, certain types of electrochemical cells may undergo relatively large dimensional changes during cycling. As one example, an electrode comprising lithium and/or lithium metal alloy may expand significantly due to lithium deposition during charging and contract significantly upon lithium ion release during discharging. Such dimensional changes of the electrochemical cells may lead to uneven pressure distributions and problematic battery pack dimensional changes.

Variances in pressure due to the conditions described above may be difficult to manage with certain techniques. Fixed plate pressure systems, for example, attempt to capture the dynamic dimensional changes of certain cells with a static solution. Spring and plate pressure systems may provide a more dynamic approach than fixed plates, but can be heavy and cumbersome. The systems and methods described herein may be used alone or combination with other techniques (e.g., by augmenting a fixed plate system), and may address the problems above by providing a dynamic solution without significant sacrifice of energy density.

Figure 1B:
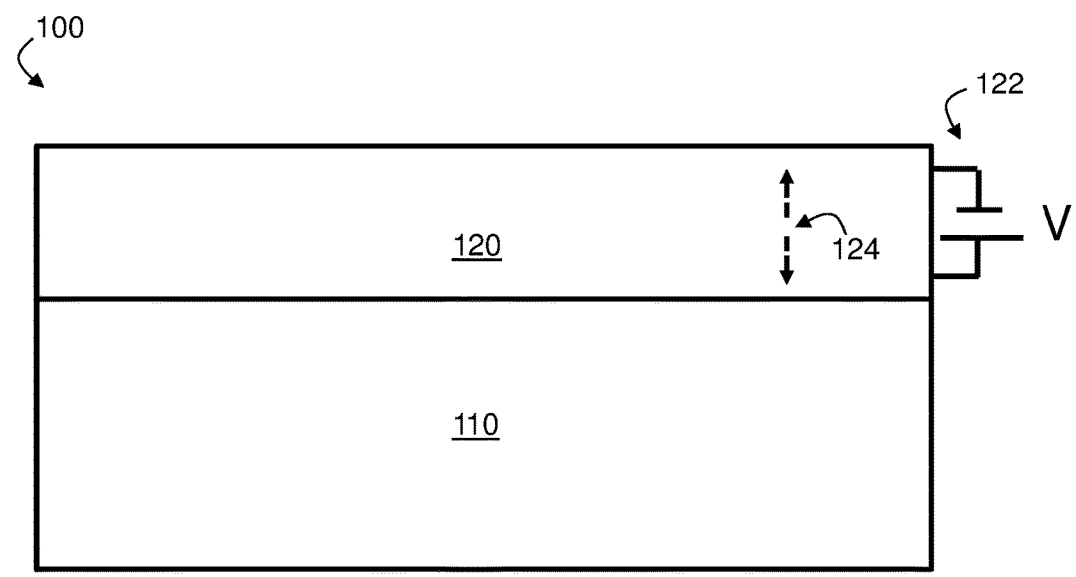

In one aspect, batteries are generally described. FIGS. 1A-1B are cross-sectional schematic diagrams of one embodiment of battery 100. The battery may comprise one or more electrochemical cells as well as one or more other components (e.g., articles stacked with the electrochemical cell(s), housings, battery control systems, electrical and thermal management equipment, etc.). In some embodiments, the battery comprises an electrochemical cell. For example, battery 100 in FIGS. 1A-1B comprises electrochemical cell 110 associated with deformable solid 120, described in more detail below. The battery may have any of a variety of suitable configurations including, but not limited to, a stacked configuration, a folded configuration, or a wound configuration. In some embodiments, at least one electrode of an electrochemical cell in the battery comprises lithium metal and/or a lithium metal alloy as an electrode active material during at least a portion of a charge/discharge cycle. For example, at least one electrode of electrochemical cell 110 may comprise lithium metal and/or a lithium metal alloy as an electrode active material during at least a portion of a charge/discharge cycle of battery 100.

Figure 2:
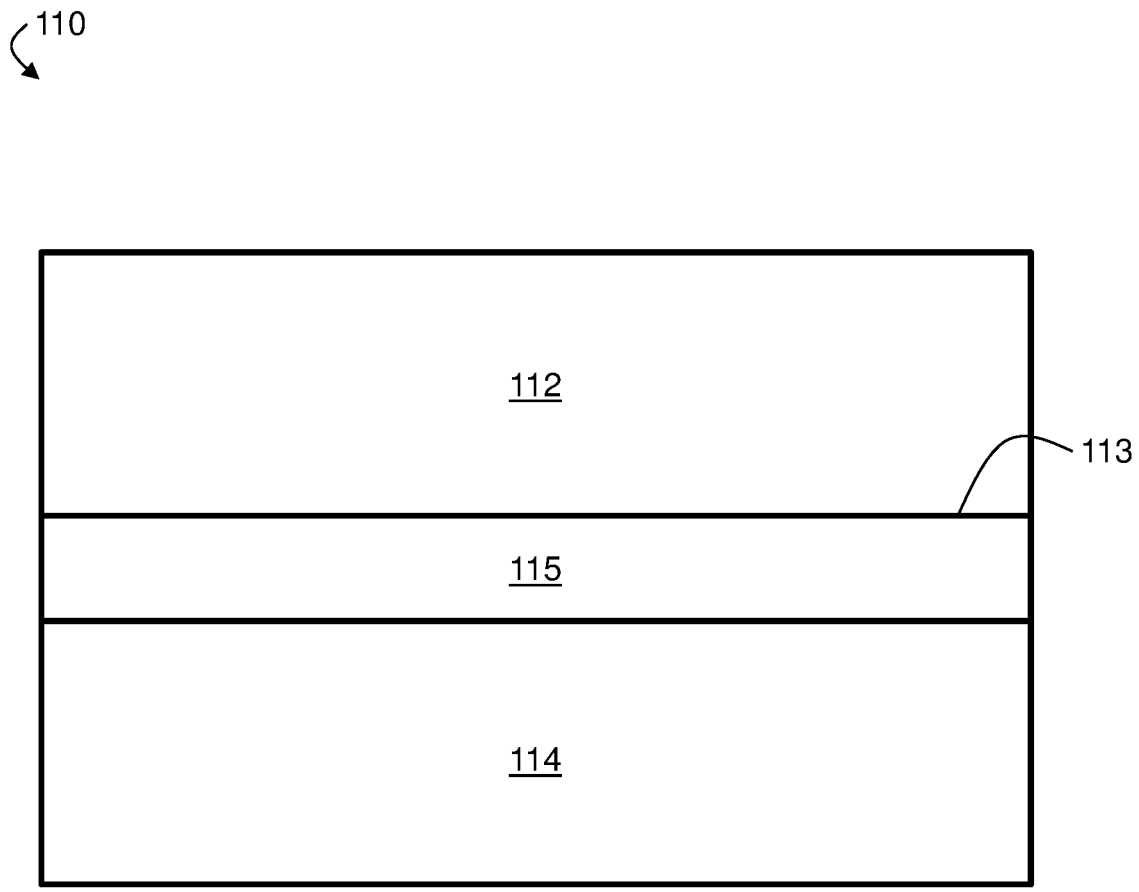
FIG. 2 shows a cross-sectional schematic diagram of an exemplary electrochemical cell, according to some embodiments.

In some embodiments, an electrochemical cell in the battery comprises an anode. FIG. 2 shows a cross-sectional schematic diagram of one exemplary embodiment of electrochemical cell 110 comprising anode 112. The anode can comprise an anode active material. As used herein, an "anode active material" refers to any electrochemically active species associated with an anode. In some embodiments, the anode comprises lithium metal and/or a lithium metal alloy as an anode active material during at least a portion of a charge/discharge cycle. For example, referring again to FIG. 2, anode 112 comprises lithium metal and/or a lithium metal alloy as an anode active material in some embodiments. In certain cases, the anode is or comprises vapor-deposited lithium (e.g., a vapor-deposited lithium film). Additional suitable anode active materials are described in more detail below. Certain embodiments described herein may be directed to systems, devices, and methods that may allow for improved performance of batteries comprising certain anodes, such as lithium metal-containing anodes. For example, certain embodiments may allow for improved magnitude and uniformity of applied force to promote uniformity of lithium deposition during charging. Remainder 116 of electrochemical cell 110 in FIG. 1A (and FIGS. 3A-3B and 7) may include components other than anode 112 that are not explicitly shown, such as a cathode and/or a separator, as described in more detail below in the context of FIG. 2.

In some embodiments, an electrochemical cell in the battery comprises a cathode. For example, referring again to FIG. 2, electrochemical cell 110 comprises cathode 114. The cathode can comprise a cathode active material. As used herein, a "cathode active material" refers to any electrochemically active species associated with a cathode. In certain cases, the cathode active material may be or comprise a lithium intercalation compound (e.g., a metal oxide lithium intercalation compound). As one non-limiting example, in some embodiments, cathode 114 in FIG. 2 comprises a nickel-cobalt-manganese lithium intercalation compound. Suitable cathode materials are described in more detail below.

As used herein, "cathode" refers to the electrode in which an electrode active material is oxidized during charging and reduced during discharging, and "anode" refers to the electrode in which an electrode active material is reduced during charging and oxidized during discharging.

In some embodiments, an electrochemical cell in the battery comprises a separator between the anode and the cathode. FIG. 2 shows exemplary separator 115 between anode 112 and cathode 114, according to certain embodiments. The separator may be a solid electronically non-conductive or insulative material that separates or insulates the anode and the cathode from each other, preventing short circuiting, and that permits the transport of ions between the anode and the cathode. In some embodiments, the separator is porous and may be permeable to an electrolyte.

In some embodiments, the battery comprises a deformable solid associated with the electrochemical cell. As mentioned above, battery 100 in FIG. 1A comprises deformable solid 120 associated with electrochemical cell 110. The deformable solid may be configured to apply an anisotropic force with a component normal to an active surface (e.g., anode active surface, cathode active surface) of an electrode of the electrochemical cell. As mentioned above and described in more detail below, application of an anisotropic force defining a pressure on an electrode may improve performance. For example, application of an anisotropic force may mitigate deleterious surface roughening or dendrite formation with some electrode materials such as lithium metal.

The deformable solid may be associated with the electrochemical cell in any of a variety of ways, provided that it can apply an anisotropic force with a component normal to an active surface of an electrode of the electrochemical cell. For example, the deformable solid may be adjacent to the electrochemical cell (e.g., in a battery stack). FIG. 1A shows deformable solid 120 adjacent to electrochemical cell 110, according to certain embodiments. In some, but not necessarily all embodiments, the deformable solid is directly adjacent to the electrochemical cell such that there are no intervening layers or components between the deformable solid and electrochemical cell. However, in other embodiments, intervening articles or layers may be present between the deformable solid and the electrochemical cell, such as sensors (e.g., pressure sensors, temperature sensors, etc.). In some embodiments, the deformable solid may be within 20 mm, within 10 mm, within 5 mm, within 1 mm, within 500 μm, within 100 μm, within 50 μm, within 10 μm, or less of the electrochemical cell in the battery.

The deformable solid may be or comprise any of a variety of solid materials (including composite materials) capable of deforming in response to an electrical potential. The electrical potential may produce a mechanical stress within the deformable solid, which may in turn produce deformation of the deformable solid (assuming no counter forces prevent the deformation). Deforming may include changes in volume (e.g., expansion, contraction) of some or all of the solid, changes in at least one dimension of some or all of the solid, changes in shape (e.g., a change in aspect ratio) of some or all of the solid, bending, and the like. The applied electrical potential should be understood to be an applied voltage (e.g., creating a difference in potential across an object).

In some embodiments, the deformable solid comprises a piezoelectric material. A piezoelectric material generally refers to a solid material that exhibits the piezoelectric effect and the inverse piezoelectric effect. The piezoelectric effect is the generation of electrical charge by the piezoelectric material that results from applying a mechanical force to the piezoelectric material. The inverse piezoelectric effect is the generation of a mechanical stress by the piezoelectric material in the presence of an electric field. One way to generate such an electric field is by an applying an electrical potential to the piezoelectric material. For example, in embodiments in which deformable solid 120 in FIGS. 1A-1B is or comprises a piezoelectric material, application of an electrical potential can cause internal generation of a mechanical stress in deformable solid 120. Piezoelectric materials include, but are not limited to, certain crystalline materials and ceramics. Piezoelectric crystalline materials may include, for example, perovskites. Examples of suitable piezoelectric crystalline materials include, but are not limited to quartz, topaz, gallium phosphate ($GaPO_4$), langasite ($La_3Ga_5SiO_{14}$), lithium niobate ($LiNbO_3$), lithium tantalite ($LiTaO_3$). Examples of suitable piezoelectric ceramics include, but are not limited to, lead zirconate titanate (Pb$[Zr_xTi_{1-x}]O_3$ with $0 \leq x \leq 1$), barium titanate ($BaTiO_3$), potassium niobate ($KNbO_3$), and sodium tungstate ($Na_2WO_3$), bismuth ferrite ($BiFeO_3$). In some, but not necessarily all embodiments, a piezoelectric material is present as a relatively large percentage of the deformable solid (e.g., greater than or equal to 10 weight percent (wt %), greater than or equal to 25 wt %, greater than or equal to 50 wt %, greater than or equal to 75 wt %, greater than or equal to 90 wt %, greater than or equal to 95 wt %, greater than or equal to 99 wt %, or more).

In some embodiments, the deformable solid comprises an electroactive polymer. An electroactive polymer generally refers to a polymer that exhibits a change in size or shape when stimulated by an electric field (e.g., caused by applying an electrical potential to the electroactive polymer). The change in size or shape of an electroactive polymer may be a field-induced mechanical stress due to any of a variety of forces, such as dielectric effects, ferroelectric effects, ionic displacement, and the like. In some embodiments in which deformable solid 120 in FIGS. 1A-1B is or comprises an electroactive polymer, application of an electrical potential can cause a mechanical stress capable of causing a size or shape change (e.g., a change in thickness) in deformable solid 120. Examples of suitable electroactive polymers include, but are not limited to elastomers (e.g., dielectric elastomers such as polydimethylsiloxane and acrylic elastomers), ionic polymers (e.g., as ionic polymer-metal composites comprising sulfonated tetrafluoroethylene copolymers such as Nafion®), ferroelectric polymers (e.g., polyvinylidene fluoride), electrostrictive polymers, and the like. When poled and annealed, poly(vinylidene fluoride) can exhibit piezoelectric properties as an electroactive polymer. Another example of a suitable electroactive polymer is a bottlebrush elastomer, in which an outer portion of the bottlebrush is confined to a solid substrate, leaving an unconfined interior portion of the polymer to expand in a vertical direction upon the application of the driving voltage. One exemplary description of bottlebrush elastomer actuation is provided in Vatankhah-Varnoosfaderani M, Daniel W F, Zhushma A P, Li Q, Morgan B J, Matyjaszewski K, Armstrong D P, Spontak R J, Dobrynin A V, Sheiko S S. Bottlebrush elastomers: A new platform for freestanding electroactuation. *Advanced Materials*. 2017 January; 29(2): 1604209, which is incorporated by reference in its entirety for all purposes. In some, but not necessarily all embodiments, an electroactive polymer is present as a relatively large percentage of the deformable solid (e.g., greater than or equal to 10 wt %, greater than or equal to 25 wt %, greater than or equal to 50 wt %, greater than or equal to 75 wt %, greater than or equal to 90 wt %, greater than or equal to 95 wt %, greater than or equal to 99 wt %, or more).

Some aspects of the present disclosure relate to applying an anisotropic force with a component normal to a surface (e.g., an electrode active surface) of an electrochemical cell. In some such cases, the anisotropic force is applied to the electrochemical cell during at least one period of time during charge and/or discharge of the electrochemical cell. Application of such forces to certain electrochemical cells (e.g., cells that undergo dimensional changes during cycling) or battery packs comprising multiple electrochemical cells may present certain challenges, including uniformity of pressure distribution for each electrochemical cell, which can be important for both performance and durability. Certain aspects described herein related to deformable solids may, in some cases, address and overcome such challenges. Some embodiments comprise applying a total anisotropic force with a component normal to an active surface of an electrode of the electrochemical cell defining a pressure of at least 10 kg/cm$^2$, at least 12 kg/cm$^2$, at least 20 kg/cm$^2$, at least 25 kg/cm$^2$, and/or up to 30 kg/cm$^2$, up to 35 kg/cm$^2$, up to 40 kg/cm$^2$, or more.

FIG. 1A depicts a schematic illustration of a force that may be applied to electrochemical cell 110 in the direction of arrow 181, according to some embodiments. Arrow 182 illustrates the component of force 181 that is normal to an active surface of an electrode of electrochemical cell 110, according to certain embodiments. As used herein, the term "active surface" is used to describe a surface of an electrode that can be in physical contact with an electrolyte when the article is part of an electrochemical cell, and at which electrochemical reactions may take place. For example, in FIG. 2, anode 112 of electrochemical cell 110 has active surface 113.

In some embodiments, the deformable solid is configured to apply an anisotropic force with a component normal to an active surface of an electrode of the electrochemical cell (e.g., during at least one period of time during charge and/or discharge of the electrochemical cell). As one example, in FIG. 1A, deformable solid 120 may be configured to apply anisotropic force 182 normal to active surface 113 of anode 112 of electrochemical cell 110. In some instances, an anisotropic force with a component normal to an active surface of an electrode of the electrochemical cell is applied, and the deformable solid contributes an entirety of the anisotropic force. However, in other instances the deformable solid contributes a portion, but not all of the magnitude of an anisotropic force with a component normal to an active surface of an electrode of the electrochemical cell, as described in more detail below. The deformable solid may be configured to apply the anisotropic force in any of a variety of ways. For example, the deformable solid and the electrochemical cell may be situated in fixed positions relative to each other such that an internal force in the deformable solid (e.g., mechanical stress) causes at least a portion of the deformable solid to press against the electrochemical cell or an intervening component.

In some embodiments, at least a portion of the deformable solid is configured to experience a mechanical stress (affecting a magnitude of the anisotropic force applied to the cell(s) of the electrochemical device) upon the application of an electrical potential to the deformable solid. As an illustrative example, referring to FIG. 1B, applying electrical potential V to deformable solid 120 via circuit 122 may cause a mechanical stress within at least a portion of deformable solid 120, represented by dashed arrows 124. One possible configuration involves associating the deformable solid with electrodes in an electrical circuit with a power source (e.g., via a controller), such that application of an electrical potential across the electrodes creates an electric field causing the mechanical stress. In some embodiments, however, no separate electrodes are present, and the deformable solid itself is directly part of a circuit with a power source. As mentioned above, piezoelectric materials and electroactive polymer are two examples of deformable materials capable of experiencing a mechanical stress upon application of an electrical potential.

Figure 3A:
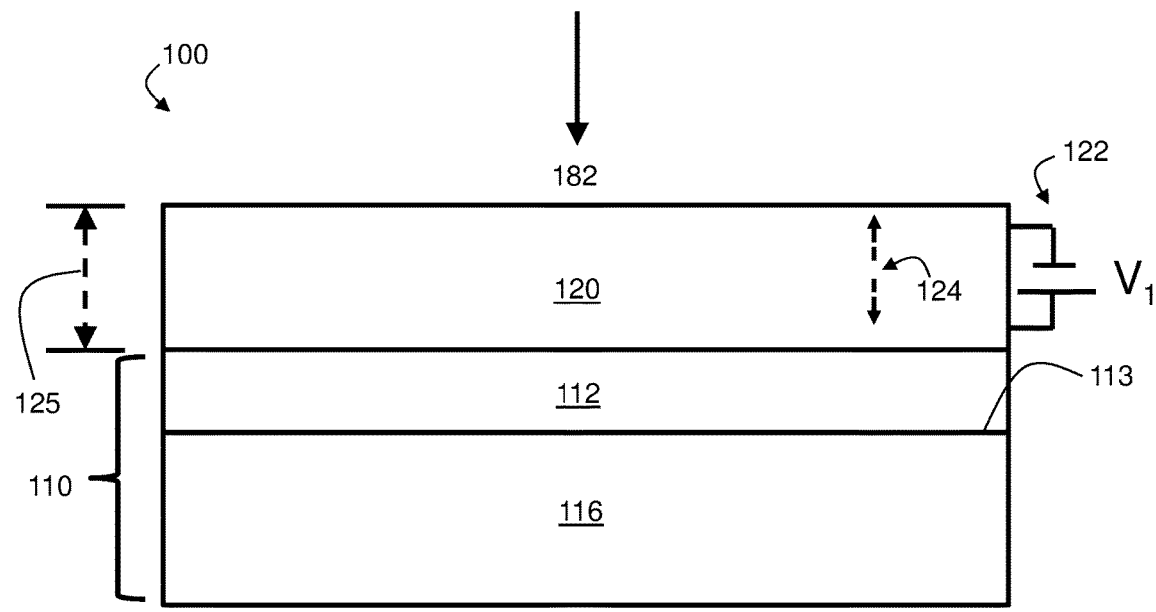
FIGS. 3A-3B show cross-sectional schematic diagrams of exemplary batteries comprising an electrochemical cell and a deformable solid under the application of electrical potentials, according to some embodiments.
Figure 3B:
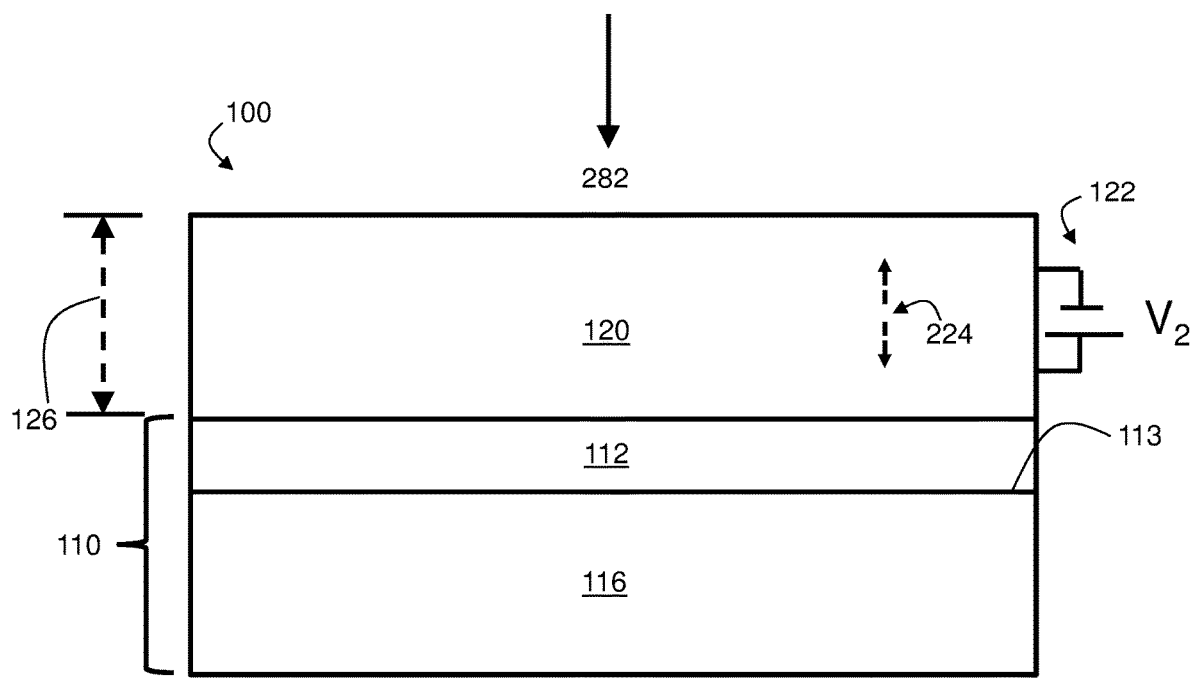

In some embodiments, the mechanical stress (e.g., generated by the applied electrical potential) causes at least a portion of the deformable solid to expand. In some such embodiments, expansion of a portion of the deformable solid involves increasing a thickness of the portion. Referring to FIGS. 3A-3B, deformable solid 120 may have thickness 125 in the absence of the electrical potential-induced mechanical stress (shown in FIG. 3A) and thickness 126 when experiencing the electrical potential-induced mechanical stress (shown in FIG. 3B), with thickness 126 being greater than thickness 125, according to some embodiments. In some cases, the portion of the deformable solid can expand in thickness by at least 1 µm, at least 5 µm, at least 10 µm, and/or up to at 20 µm or more due to the mechanical stress (e.g., generated by the applied electrical potential). Expansion of at least a portion of the deformable solid may affect a magnitude of the anisotropic force applied to the electrochemical cell in some instances where the deformable solid and the electrochemical cell are fixed adjacent to each other. The expansive force within the portion of the deformable solid may increase a magnitude of the force that is ultimately applied to the electrochemical cell. In some embodiments, expansion of at least a portion of the deformable solid due to the mechanical stress may be caused by the inverse piezoelectric effect initiated by the applied electrical potential.

In some embodiments, the mechanical stress (e.g., generated by the applied electrical potential) causes at least a portion of the deformable solid to contract. In some such embodiments, contraction of a portion of the deformable solid involves decreasing a thickness of the portion. Referring to FIGS. 3A-3B, deformable solid 120 may have thickness 126 in the absence of the electrical potential-induced mechanical stress (shown in FIG. 3B) and thickness 125 when experiencing the electrical potential-induced mechanical stress (shown in FIG. 3A), with thickness 126 being greater than thickness 125, according to some embodiments. In some cases, the portion of the deformable solid can contract in thickness by at least 1 µm, at least 5 µm, at least 10 µm, and/or up to at 20 µm or more due to the mechanical stress (e.g., generated by the applied electrical potential). Contraction of at least a portion of the deformable solid may affect a magnitude of the anisotropic force applied to the electrochemical cell in some instances where the deformable solid and the electrochemical cell are fixed adjacent to each other. The contractive force within the portion of the deformable solid may decrease a magnitude of the force that is ultimately applied to the electrochemical cell. In some embodiments, contraction of at least a portion of the deformable solid due to the mechanical stress may be caused by the inverse piezoelectric effect.

It should be understood that in some instances, no observable deformation (e.g., expansion, contraction) of the deformable solid occurs when the deformable solid experiences the mechanical stress. For example, in some instances, a balance of forces experienced by the deformable solid from other components of the battery during operation may be such that the mechanical stress does not lead to observable deformation of the deformable solid. In some such cases, the mechanical stress within the deformable solid affects the magnitude of force applied by the deformable solid to the electrochemical cell even in the absence of observable deformation.

Some embodiments involve a portion of the deformable solid applying anisotropic forces to the electrochemical cell with differing magnitudes at different times. Controlling the magnitude of force applied by the deformable solid can allow for any of a variety of advantages. For example, changes to the electrochemical cell (e.g., changes in cell dimensions) may occur during a charge/discharge cycle of the battery, and may cause the pressure the cell experiences to vary with time. This changing pressure may inhibit consistent performance of the battery and/or limit its durability. By controlling a magnitude of force applied by the deformable solid, changes to the electrochemical cell can be compensated for such that the electrochemical cell experiences a consistent pressure over time. Aspects of the present disclosure can, in some instances, provide for precise, active, controllable force compensation without the need for expensive or heavy/bulky battery components or, in some instances human interaction. For example, the systems and methods described herein may, in some embodiments, operate as a closed loop system. In some instances, the controllable force compensation involves the application of electrical potentials to the deformable solid configured as described herein.

In some embodiments, an electrical potential is applied to the deformable solid such that at least a portion of the deformable solid experiences a mechanical stress, and that portion of the deformable solid applies a first anisotropic force with a component normal to an active surface of an electrode of the electrochemical cell. For example, referring again to FIGS. 3A-3B, some embodiments comprise applying a first electrical potential $V_1$ to deformable solid 120 via circuit 122 such that at least a portion of deformable solid 120 experiences a mechanical stress represented by dashed arrows 124 (shown in FIG. 3A). The mechanical stress causes the portion of deformable solid 120 to apply a first anisotropic force with component 182 normal to active surface 113 of anode 112 of electrochemical cell 110, according to some embodiments.

Then, in some embodiments, the electrical potential applied to the deformable solid is changed such that the mechanical stress experienced by the portion of the deformable solid changes (e.g., the stress remains but at a different magnitude, or the stress is eliminated). In some such embodiments, the portion of the deformable solid then applies a second anisotropic force with a component normal to the electrode active surface having a magnitude that is different than that of the first anisotropic force or is zero. This is illustrated in FIG. 3B, where first electrical potential $V_1$ is changed to second electrical potential $V_2$, according to some embodiments. Changing to second electrical potential $V_2$ may change the mechanical stress experienced by the portion of deformable solid 120, represented by dashed arrows 224 stress altogether, according to some embodiments. The change of the mechanical stress experienced by deformable solid 120 causes the portion of deformable solid 120 to apply a second anisotropic force with component 282 normal to active surface 113 of anode 112 of electrochemical cell 110, according to some embodiments. Component 282 may have a different (e.g., larger, smaller) magnitude than that of component 182. In some embodiments, component 282 has a magnitude of zero.

In some embodiments, changing the electrical potential applied to the deformable solid involves increasing the magnitude of the applied potential. In some embodiments, changing the electrical potential applied to the deformable solid involves reducing the magnitude of the applied potential. In some embodiments, the electrical potential is changed from a non-zero value to a value of zero (i.e., no electrical potential is applied). Conversely, in some embodiments, the electrical potential is changed from a value of zero to a nonzero value.

The battery may be configured to change the electrical potential (e.g., from a first electrical potential to a second electrical potential). For example, in some embodiments, the battery comprises and/or is electrically coupled to a battery control system configured to change the electrical potential. The battery control system may comprise one or more microcontrollers configured to adjust the output of a power supply sharing an electrical circuit with the deformable solid such that the electrical potential changes. Further details of possible battery control systems are described in more detail below.

As mentioned above, in some cases, the electrochemical cell undergoes a change in at least one dimension during at least a portion of a charge/discharge cycle (e.g., in some instances where lithium metal and/or a lithium metal alloy is an electrode active material). In some such cases, it is beneficial to change a magnitude of applied anisotropic force such that the electrochemical cell experiences a constant pressure even during or after a change in at least one dimension. Changing the electrical potential applied to the deformable solid can, in some instances, accomplish such a change in applied force.

In some embodiments, the electrical potential applied to the deformable solid is changed, at least in part, in response to and/or simultaneous with a change in at least one dimension of the electrochemical cell. For example, referring again to FIGS. 3A-3B, a change in at least one dimension of electrochemical cell 110 (e.g., during at least a portion of a charge/discharge cycle) may initiate an electrical signal that causes the electrical potential applied to deformable solid 120 to change from first electrical potential $V_1$ to second electrical potential $V_2$. The electrical signal may be initiated by a sensor in the battery or otherwise associated with the electrochemical configured to detect changes in at least one dimension of the electrochemical cell.

In some embodiments, the electrical potential applied to the deformable solid is changed simultaneously with a change in at least one dimension of the electrochemical cell. In some such instances, the change in electrical potential is not initiated by an electrical signal from a sensor, but is based on a pre-programmed signal (or sequence of signals) based on expected changes in at least one dimension of the electrochemical cell during a charge and/or discharge process. Such a process may be controlled by a battery control system.

Figure 4:
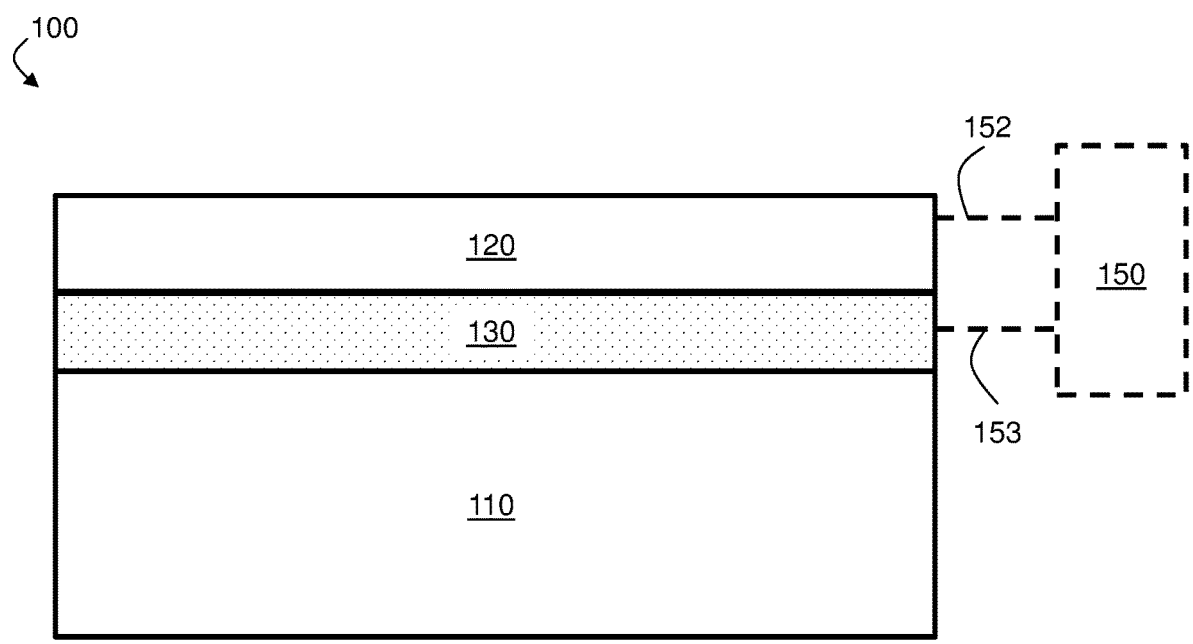
FIG. 4 shows a cross-sectional schematic diagram of an exemplary battery comprising an electrochemical cell, a deformable solid, a pressure sensor, and an optional battery control system, according to some embodiments.

In some embodiments, the electrochemical cell is associated with a pressure sensor. For example, FIG. 4 shows a cross-sectional schematic diagram of one embodiment of battery 100 comprising pressure sensor 130 associated with the electrochemical cell 110. The pressure sensor may be in a position and configured such that a magnitude and/or distribution of pressure determined by the pressure sensor is indicative of a magnitude and/or distribution of pressure experienced by the electrochemical cell. The pressure sensor may be associated with the electrochemical cell in any of a variety of manners. For example, the pressure sensor may be adjacent to the electrochemical cell. In some, but not necessarily all embodiments, the pressure sensor is directly adjacent to the electrochemical cell such that there are no intervening layers or components between the pressure sensor and electrochemical cell. However, in other embodiments, intervening articles or layers may be present between the pressure sensor and the electrochemical cell, such as other sensors (e.g., temperature sensors, cooling elements, spacers, etc.). The pressure sensor may be, in certain embodiments, within 20 mm, within 10 mm, within 5 mm, within 1 mm, within 500 μm, within 100 μm, within 50 μm, within 10 μm, or less of the electrochemical cell in the battery. In some embodiments, the pressure sensor is between the deformable solid and the electrochemical cell. For example, FIG. 4 shows battery 100 comprising deformable solid 120, electrochemical cell 110, and pressure sensor 130 between deformable solid 120 and electrochemical cell 110.

Any of a variety of suitable pressure sensors may present in the battery. The pressure sensor may be chosen based on expected magnitudes of pressure, desired pressure resolution (both in terms of magnitude or spatial distribution), and/or desired dimensions (e.g., compatible with dimensions of the battery). In some embodiments, the pressure sensor comprises a sensor array. One non-limiting example of a suitable pressure sensor is a Tekscan 5101 sensor array. In some cases, the pressure sensor is a capacitance-based pressure sensor. One example of a capacitance-based pressure sensor is one comprising two electrodes with an electrically insulative material between the two electrodes. The electrically insulative material may have a known dielectric constant. In certain cases, the electrically insulative material is configured such that the force applied to the capacitive-based sensor comprising the two electrodes in the electrically insulative material causes the thickness of the electrically insulative material to change, thereby varying a measured capacitance between the two electrodes. For example, in some cases, the electrically insulative material between the two electrodes is a polymeric material. The polymeric material may be relatively soft and have a known dielectric constant. In some cases, the pressure sensor is or comprises a strain gauge. In certain embodiments, the pressure sensor comprises a piezoelectric or piezoresistive sensor. Such sensors typically comprise piezoelectric or piezoresistive materials coupled to an external electrical circuit capable of detecting and measuring change in electric charge or resistance upon mechanical deformation of the materials. In certain embodiments, the pressure sensor is or comprises a thin film. Non-limiting examples of pressure sensors (e.g., in thin film form) are described in F. Schmaljohann, D. Hagedorn, and F. Löffler. "Thin Film Sensors for measuring small forces." *Journal of Sensors and Sensor Systems*. No. 4, (February 2015), 91-95. In some cases, the pressure sensor is commercially available and coupled to the electrochemical cell. However, in some cases, the pressure sensor (e.g., a thin film pressure sensor) is fabricated during the manufacture of the battery. In some such cases, the pressure sensor is formed by vacuum deposition, coating and curing (e.g., in the case of polymeric materials), printing (e.g., inkjet printing, screen-printing), and/or by spray methods (e.g., aerosol spray methods).

In some embodiments, a change in an electrical potential applied to the deformable solid is, at least in part, in response to an electrical signal generated by a pressure sensor associated with the electrochemical cell. For example, referring again to FIGS. 3A-3B and 4, a change from applying first electrical potential $V_1$ to deformable solid 120 to applying second electrical potential $V_2$ to deformable solid 120 may be, at least in part, in response to an electrical signal generated by pressure sensor 130 (shown in FIG. 4). In such a way, the magnitude of anisotropic force applied to the electrochemical cell at least in part by the deformable solid can, in some instances, be adjusted based on in situ pressure measurements in the battery. The pressure sensor may detect changes in the magnitude of pressure experienced by the electrochemical cell for any of a variety of reasons. For example, changes in at least one dimension of the electrochemical cell, changes in temperature, changes in external forces experienced by the battery, and the like may cause a pressure experienced by the electrochemical cell to deviate from a desired pressure. These deviations may be detected by the pressure sensor, which may generate an electrical signal that ultimately changes an electrical potential applied to the deformable solid. In response to such a change in applied electrical potential, mechanical stress experienced by the deformable solid may be altered or removed. The change or removal of the mechanical stress may alter (e.g., increase, decrease) a resulting magnitude of anisotropic force exerted by the deformable solid on the electrochemical cell such that a pressure experienced by the electrochemical cell approaches or reaches the desired pressure.

In some embodiments, the battery is configured to operate in a closed-loop configuration where the pressure sensor determines a measured pressure (e.g., during charging and/or discharging), determines an "error signal" (deviation) from a target pressure, and generates a signal (e.g., electrical signal). Generation of the signal results in a change in electrical potential applied to the deformable solid (e.g., piezoelectric material, electroactive polymer). The change an electrical potential applied to the deformable solid results in a change in a force exerted by the deformable solid that decreases the magnitude of the "error" measured by the pressure sensor. This process may be repeated until the error determined by the pressure sensor is within a desired tolerance (e.g., within 5%, within 2%, within 1%, within 0.1%, or less) of the target pressure.

In some embodiments, the battery comprises or is coupled to a battery control system. The battery control system can comprise one or more processors and/or management circuitry. The one or more processors may be configured to control one or more components of the battery, including the deformable solid and/or the pressure sensor (if present). In some instances, the battery control system comprises a microcontroller. Examples of suitable processors are described in more detail below.

The battery control system may be configured to control (e.g., modulate) an electrical potential applied to the deformable solid of the battery. For example, referring to the cross-sectional schematic diagram in FIG. 4, battery 100 may comprise optional battery control system 150 configured to control an electrical potential applied to deformable solid 120 via optional wire(s) 152. The battery control system may be configured to receive an electrical signal that results in a change to the electrical potential applied to the deformable solid. As one example, in some embodiments, the battery control system is configured to receive an electrical signal from the pressure sensor (e.g., indicative of a pressure measurement). Upon receipt of the electrical signal received from the pressure sensor, the battery control system may subsequently change an electrical potential applied to the deformable solid such that a pressure experienced by the electrochemical cell is changed. Referring to FIG. 4, for example, in some embodiments a pressure measurement determined by pressure sensor 130 indicative of a pressure experienced by electrochemical cell 110 results in a signal propagating from pressure sensor 130 to optional battery control system 150 via optional wire 153, and optional battery control system 150 changes an electrical potential (e.g., initiates, increases, decreases, ceases) applied to deformable solid 120 such that a magnitude of anisotropic force applied to electrochemical cell 110 changes. The change in the magnitude of anisotropic force may result in a pressure experienced by the electrochemical cell to become closer to or reach a desired pressure (e.g., a target pressure).

Figure 5A:
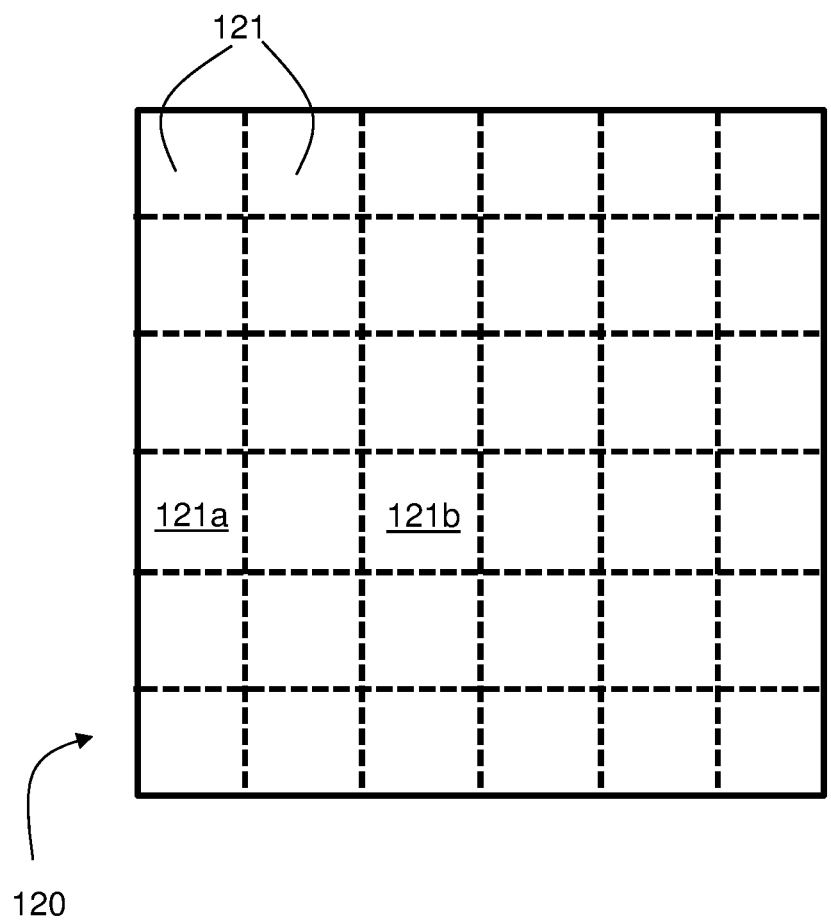
FIG. 5A shows a front view schematic diagram of an exemplary deformable solid comprising independently addressable deformable solid segments, according to some embodiments.

In some embodiments, the deformable solid comprises an array of independently addressable deformable solid segments. FIG. 5 shows a front-view schematic illustration of one embodiment of deformable solid 120 comprising an array of independently addressable deformable solid segments 121. The array of independently addressable deformable solid segments may be arranged in any of a variety of ways, such as a two-dimensional grid (as shown in FIG. 5). Deformable solid segments are considered independently addressable if they can be independently actuated or modulated (e.g., by individual signals and/or individual applications of electrical potentials). For example, referring again to FIG. 5A, first independently addressable deformable solid segment 121a can, in some embodiments, be actuated or deformed independently of second independently addressable deformable solid segment 121b. In some instances, a first independently addressable deformable solid segment can receive a first electrical potential and a second independently addressable deformable solid segment can receive a second electrical potential. In some such cases, the first electrical potential and the second electrical potential are different (different magnitude and/or sign). In certain cases, the first independently addressable deformable solid segment can receive the first electrical potential at least partially concurrently with the second independently addressable deformable solid segment receiving the second electrical potential. One way in which deformable solid segments may be independently addressed is by having each deformable solid segment have separate electrical couplings to a battery control system, and/or each deformable solid segment having its own microcontroller. The independently addressable deformable solid segments may be separately addressed using standard electronics such as matrix switchers or multiplexers.

Figure 5B:
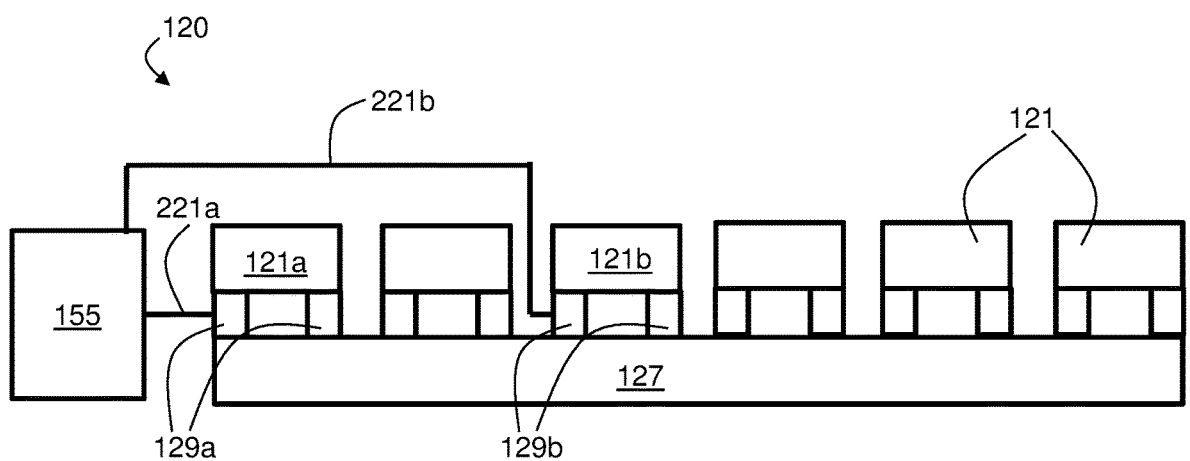
FIG. 5B shows a cross-sectional schematic diagram of a deformable solid comprising independently addressable solid segments on a solid substrate, according to some embodiments.

In some, but not necessarily all embodiments, the deformable solid comprises the independently addressable deformable solid segments as discrete segments on a solid substrate. The discrete segments may include associated conductive solids (e.g., between the independently addressable deformable solid segments and the substrate). FIG. 5B shows a cross-sectional schematic diagram of one embodiment of deformable solid 120 comprising independently addressable deformable solid segments 121 including first independently addressable deformable solid segment 121a and second independently addressable deformable solid segment 121b. In the embodiment shown in FIG. 5B, deformable solid 120 comprises solid substrate 127. First conductive solid pair 129a is between first independently addressable deformable solid segment 121a and solid substrate 127, and second conductive solid pair 129b is between second independently addressable deformable solid segment 121b and solid substrate 127, in accordance with certain embodiments. FIG. 5B shows multiplexer 155 electronically coupled to first independently addressable deformable solid segment 121a via first conductive solid pair 129a and optional wire 221a, according to certain embodiments. FIG. 5B further shows multiplexer 155 separately electronically coupled to second independently addressable deformable solid segment 121b via second conductive solid pair 129b and optional wire 221b, according to certain embodiments. Multiplexer 155 may be configured to receive electrical signals (e.g., from a battery control system) and to independently actuate first independently addressable deformable solid segment 121a and second independently addressable deformable solid segment 121b.

In some embodiments, the independently addressable deformable solid segments comprise a piezoelectric material. For example, a deformable solid may comprise a "piezoelectric array" of independently addressable deformable solid segments, each comprising a piezoelectric material. It has been realized in the context of the present disclosure that such a "piezoelectric array" may be conveniently integrated into a battery and with battery control systems as described in this disclosure. Suitable piezoelectric arrays are commercially available, for example from NGK Insulators, Ltd, Omega Piezo Technologies, Inc., and Olympus Corporation. In some embodiments, the independently addressable deformable solid segments comprise an electroactive polymer. In some embodiments, the deformable solid is or comprises an array of independently addressable deformable solid segments, with the independently addressable deformable segments comprising a bottlebrush elastomer polymer.

In some embodiments, each of the independently addressable deformable solid segments is configured to experience a mechanical stress upon the application of an electrical potential to the deformable solid. In some embodiments a single electrical potential applied to the deformable solid induces each independently addressable deformable solid segment to experience a mechanical stress. However, in other embodiments each independently addressable deformable solid segment is configured to experience a mechanical stress upon application an electrical potential applied only to that segment. The mechanical stress experienced by one independently addressable deformable solid segment may be independent of a mechanical stress experienced by another independently addressable deformable solid segment of the deformable solid. For example, referring to FIG. 5A, application of an electrical potential to deformable solid 120 may result in independently addressable deformable solid segment 121a experiencing a first mechanical stress and independently addressable deformable solid segment 121b experiencing a different mechanical stress (e.g., a different magnitude or none at all). In some such cases the electrical potential is directed to some independently addressable deformable solid segments but not others, while in certain cases different magnitudes or signs of electrical potentials are directed to different independently addressable deformable solid segments. As mentioned above, the mechanical stress experienced by a portion (e.g., segment) of a deformable solid can affect the magnitude of anisotropic force exerted by that portion. Therefore, some embodiments described herein involving arrays of independently addressable deformable solid segments can allow for the application of different magnitudes of anisotropic force by different portions (e.g., segments) of the deformable solid. This may be useful in certain instances where it is desirable that different parts of the electrochemical cell experience different magnitudes of force from the deformable solid (e.g., to control the pressure distribution and/or achieve a uniform pressure distribution).

The number and/or size of independently addressable deformable segments in the deformable solid may affect the resolution at which different magnitudes of anisotropic force can be applied to the electrochemical cell. For applications in which fine control of the spatial distribution of applied force is desired, the deformable solid having a high density of independently addressable deformable solid segments may be used. In applications in which a high resolution of force control is not needed, deformable solids comprising fewer independently addressable deformable solid segments may be used. In some embodiments, the deformable solid comprises an array of independently addressable deformable solid segments, with the array having greater than or equal to 1, greater than or equal to 2, greater than equal to 4 (e.g., a 2×2 array), greater than equal to 9 (e.g., a 3×3 array), greater than equal to 16 (e.g., a 4×4 array), greater than equal to 36 (e.g., a 6×6 array), and/or up to 49 (e.g., a 7×7 array), up to 64 (e.g., an 8×8 array), up to 100 (e.g., a 10×10 array), up to 256 (e.g., a 16×16 array), up to 1024 (e.g., a 32×32 array), up to 10,000 (e.g., a 100×100 array), up to 65,536 (e.g., a 256×256 array) independently addressable deformable solid segments or more. An independently addressable deformable solid segment may have any suitable size, depending, for example, on the desired density of segments. In some embodiments, an independently addressable deformable solid segment has an area of greater than or equal to 100 $\mu m^2$, greater than or equal to 1000 $\mu m^2$, greater than or equal to 1 $mm^2$, greater than or equal to 10 $mm^2$, and/or up to 1 $cm^2$, to 5 $cm^2$, up to 10 $cm^2$, up to 100 $cm^2$, or more.

Figure 6A:
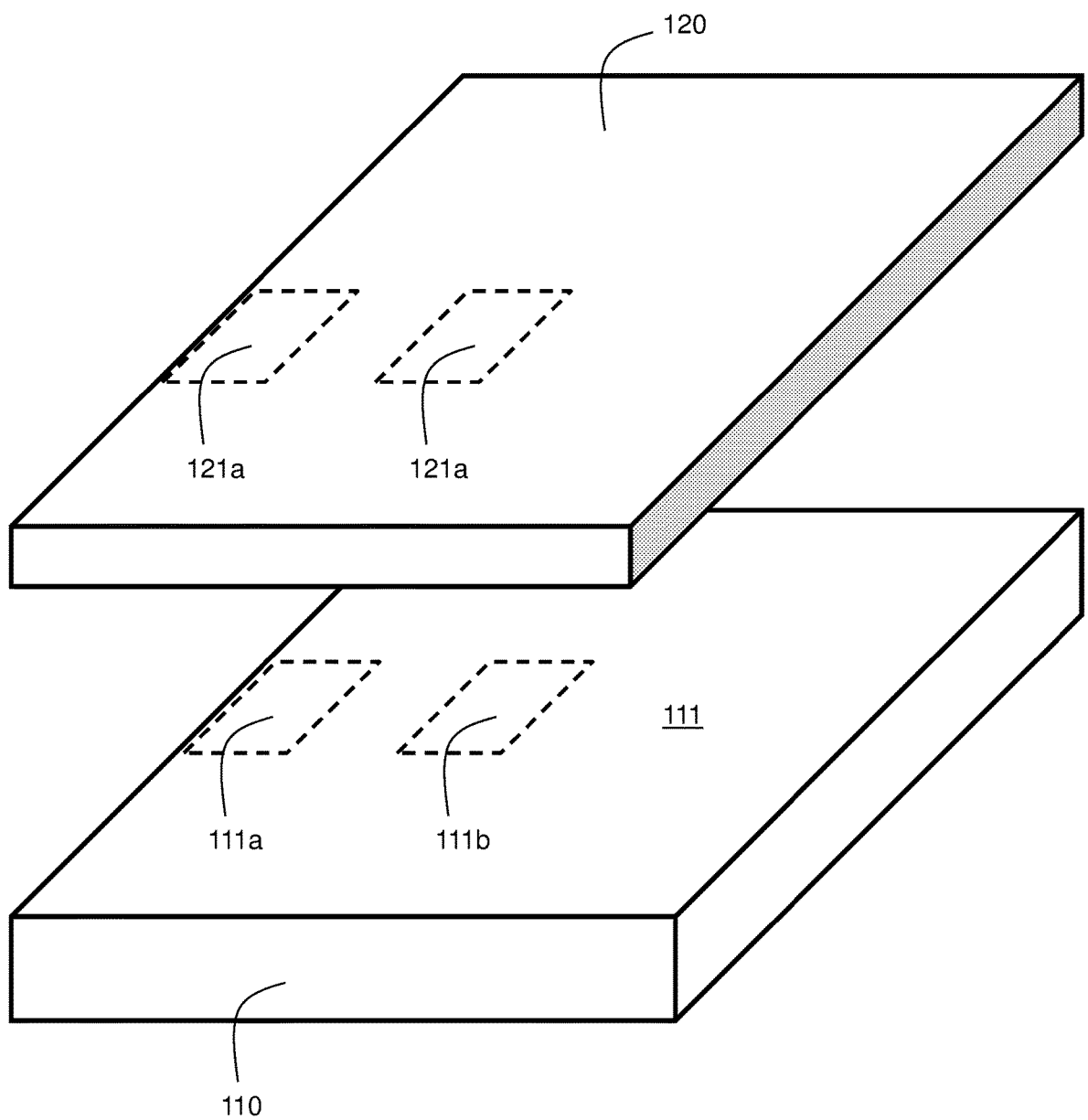
FIG. 6A shows an exploded perspective view diagram of a deformable solid comprising independently addressable deformable solid segments and an electrochemical cell comprising a first region and a second region, according to some embodiments.

In some embodiments, a first anisotropic force is applied to a first region of an electrochemical cell, and a second anisotropic force is applied to a second region of the surface of the electrochemical cell. The first anisotropic force and the second anisotropic force may have a component normal to the surface (e.g., an electrode active surface). The first region and the second region may be different regions. In some cases the first region and the second region do not overlap. FIG. 6A shows a perspective view schematic diagram of the electrochemical cell 110 comprising surface 111, according to certain embodiments. In some embodiments, a first anisotropic force is applied to first region 111a of surface 111, and a second anisotropic force is applied to second region 111b of surface 111. Application of the first anisotropic force may be based at least part on a first electrical signal, and application of the second anisotropic force may be in response to a second electrical signal. Referring again to FIG. 6A, some embodiments may comprise applying the first anisotropic force to first region 111a of surface 111 based on a first electrical signal and applying the second anisotropic force to second region 111b of surface 111 based on a second, different electrical signal. The first electrical signal and the second electrical signal may be generated by separate microcontrollers in some embodiments. A battery control system may be configured to send the first electrical signal and the second electrical signal to initiate the application of the first anisotropic force and the second anisotropic force, respectively.

The first anisotropic force applied to the first region of the surface of the electrochemical cell may have a different magnitude than the second anisotropic force applied to the second region of the surface of the electrochemical cell. Applying different magnitudes of force to different regions of a surface of an electrochemical cell may, in certain cases, allow for control of a pressure distribution experienced by the electrochemical cell. For example, the first anisotropic force and the second anisotropic force may be modulated such that the electrochemical cell experiences a relatively uniform pressure distribution. A uniform pressure distribution may be beneficial in some cases, such as electrochemical cells comprising electrode active materials that may undergo deleterious roughening or dendrite formation affected by a magnitude of pressure. Application of different magnitudes of force at different regions of the electrochemical cell may result in a uniform pressure distribution even in situations where an interior portion of the surface of the electrochemical cell and an exterior portion of the electrochemical cell would otherwise experience different pressures (e.g., due to the environment of the battery and/or a design of a pressure application device).

In some embodiments, application of the second anisotropic force occurs during at least a portion of the time during which the application of the first anisotropic force occurs. In some embodiments, the first anisotropic force in the second anisotropic force are applied simultaneously.

In some embodiments, the first anisotropic force and the second anisotropic force are each applied via the deformable solid. For example, referring again to the exploded schematic diagram in FIG. 6A, in some embodiments, a first anisotropic force is applied to the first region 111a via deformable solid 120 and the second anisotropic force is applied to second region 111b via deformable solid 120. The first anisotropic force and the second anisotropic force may be applied via different portions of the deformable solid. As one example, the deformable solid may comprise an array of independently addressable deformable solid segments, as described above. In some such cases, the first anisotropic force is applied via a first deformable solid segment of the array and the second anisotropic force is applied via a second deformable solid segment of the array. In FIG. 6A, first independently addressable deformable solid segment 121a of deformable solid 120 may apply a first anisotropic force to first region 111a of surface 111 of the electrochemical cell 110 based on a first electrical signal, according to certain embodiments. Further, second independently addressable deformable solid segment 121b may apply a second anisotropic force to second region 111b of surface 111 based at least in part on a second electrical signal. Referring back to the embodiment of deformable solid 120 shown in FIG. 5B, first independently addressable deformable solid segment 121a and second independently addressable deformable solid segment 121b may apply independent anisotropic forces by receiving separate electrical signals from multiplexer 155. Because first independently addressable deformable solid segment 121a and second independently addressable deformable solid segment 121b are discrete segments on solid substrate 127, first independently addressable deformable solid segment 121a may experience an electrical potential-induced mechanical stress (and potential deformation) that is independent of an electrical potential-induced mechanical stress (and potential deformation) experienced by second independently addressable deformable solid segment 121b. The ability to experience independent electrical potential-induced mechanical stresses may, in some instances, provide for a way for independently addressable deformable solid segments to apply different anisotropic forces to different regions of a surface of the electrochemical cell. Use of the deformable solid comprising an array of independently addressable deformable solid segments (e.g., piezoelectric segments, electroactive polymer segments) may provide for a convenient, highly-controllable, dynamic method for controlling the spatial distribution of force received by the electrochemical cell in the battery.

In some embodiments involving the application of a first anisotropic force to the first region and a second anisotropic force to the second region based on first and second electrical signals, the first electrical signal is received from a first pressure sensor segment associated with the first region of the surface and the second electrical signal is received from a second pressure sensor segment associated with the second region of the surface. The pressure sensor segments may be part of a two-dimensional arrangement of pressure segments. For example, the pressure sensor may comprise an array of independently addressable pressure sensor segments. Each of the independent pressure sensor segments may be capable of independently determining a pressure measurement. For example, referring to the exploded schematic diagram in FIG. 6B, pressure sensor 130 may comprise first pressure sensor segment 131a and second pressure sensor segment 131b, which may be part of an array in some embodiments. In one possible implementation, first pressure sensor segment 131a associated with first region 111a of surface 111 sends an electrical signal (e.g., indicative of a pressure measurement) that causes first independently addressable deformable solid segment 121a associated with first pressure sensor segment 131a to apply a first anisotropic force to first region 111a. At the same time or at a different time, second pressure sensor segment 131b associated second region 111b of surface 111 sends an electrical signal (e.g., indicative of a pressure measurement) that causes second independently addressable deformable solid segment 121b associated with second pressure sensor segment 131b to apply a second anisotropic force to second region 111b. Some such configurations may be useful in monitoring the spatial distribution of pressure experienced by the electrochemical cell and, based at least in part on that measured distribution, spatially controlling the application of force to the electrochemical cell to achieve a desired pressure distribution. In some embodiments, such a process is performed in a closed-loop manner.

Figure 6B:
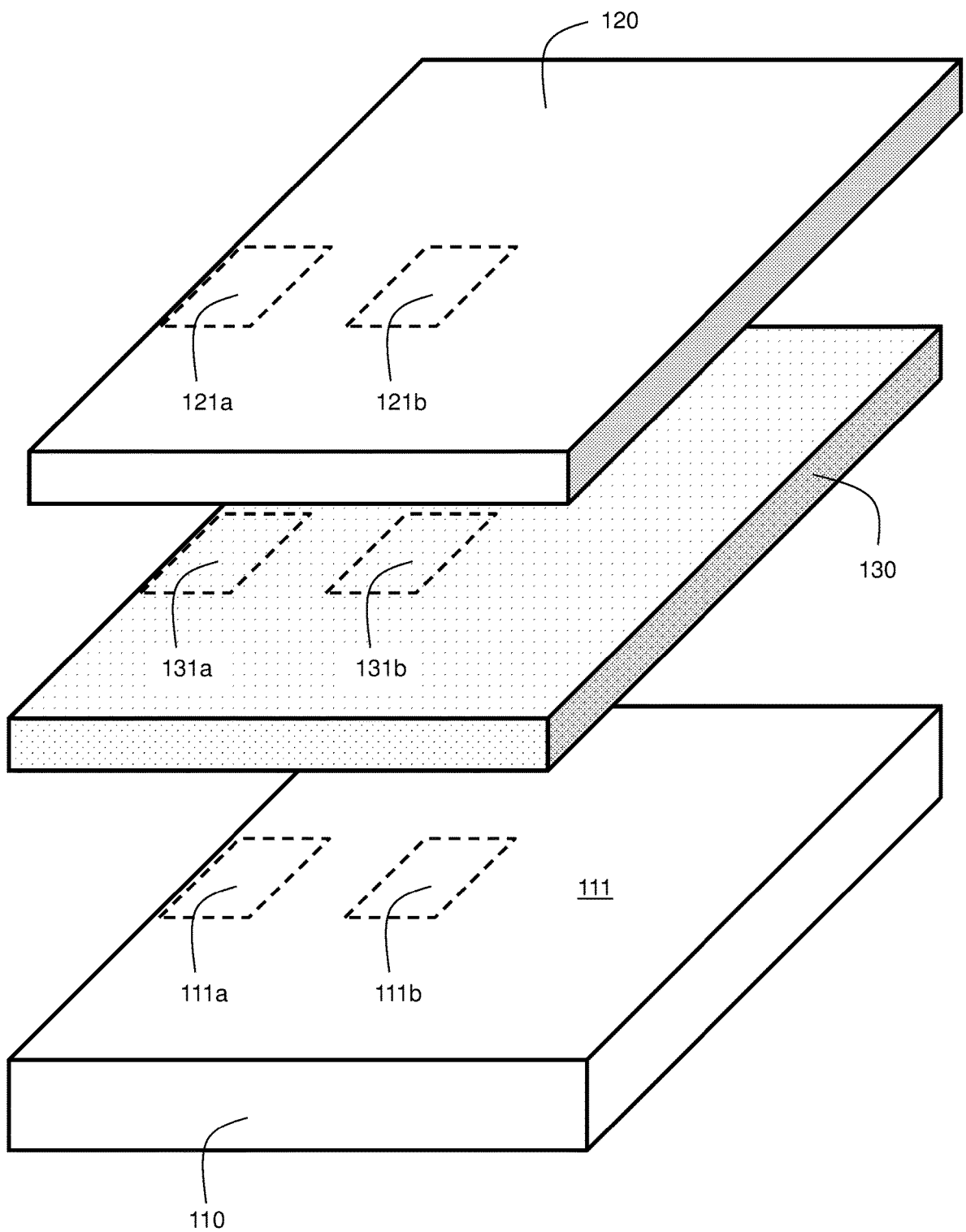
FIG. 6B shows an exploded perspective view diagram of an exemplary deformable solid comprising independently addressable deformable solid segments, a pressure sensor comprising independently addressable pressure sensor segments, and an electrochemical cell comprising a surface comprising a first region and a second region, according to some embodiments.

In some embodiments, the first anisotropic force and the second anisotropic force with components normal to the surface of the electrochemical cell are applied such that a pressure experienced by the first region (e.g., first region 111a in FIGS. 6A-6B) of the surface is relatively similar to the pressure experienced by the second region of the surface (e.g., second region 111b in FIGS. 6A-6B). As explained above, a consistent pressure distribution may improve performance and/or durability of certain electrochemical cells (e.g., lithium-containing electrochemical cells), for example by promoting uniform current utilization. It is believed that some methods of pressure application (e.g., with certain solid endplates) result in different magnitudes of pressure at the center of the cell compared to the edge of the cell. This may result in a different utilization of the center of the cell compared to the edge of the cell, which can in some cases decrease the cycling lifetime of the battery. The methods and configurations described herein, such as those involving applying different anisotropic forces at different regions of the electrochemical cell, can, in some instances, provide a controllable way to reduce potential non-uniformity in pressure distribution.

In some embodiments, the first anisotropic force and the second anisotropic force with components normal to the surface of the electrochemical cell are applied such that a pressure experienced by the first region of the surface is within 5%, within 2.5%, within 1%, within 0.5%, within 0.1%, or equal to the pressure experienced by the second region of the surface. The percentages are determined relative to the lower of the two pressures. For example, if the first region experiences a pressure of 21 kg$_f$/cm$^2$ and the second region experiences a pressure of 20 kg$_f$/cm$^2$, then the pressure experienced by the first region is (21−20)/20× 100%=5% from the pressure experienced by the second region. Similarly, if the first region experiences a pressure of 20 kg$_f$/cm$^2$ and the second region experiences a pressure of 21 kg$_f$/cm$^2$, then the pressure experienced by the first region is (21−20)/20×100%=5% from the pressure experienced by the second region. The pressure at each of the first region and the second region of the surface of the electrochemical cell may be determined, for example, using a pressure sensor comprising a first pressure sensor segment associated with the first region of the surface and a second pressure sensor segment associated with the second region of the surface. In some embodiments, read-out from the pressure sensor and subsequent adjustment of the applied anisotropic forces (e.g., via a deformable solid) may be used to achieve such a consistent pressure distribution.

In some embodiments, the first anisotropic force and the second anisotropic force with components normal to the surface of the electrochemical cell are applied such that a relatively high percentage of the surface experiences a pressure that is relatively close to an average pressure across the surface. The average pressure across the surface can be determined by using a pressure sensor with two-dimensional spatial resolution (e.g., a Tekscan 5101 pressure sensor) to determine a pressure distribution across the surface, and then taking the number average of the pressures within the distribution. As an example, referring to FIG. 6A, an average pressure experienced by surface 111 across a lateral plane defined by surface 111 can be determined by measuring the pressure across surface 111 and determining a number average of those pressures. The percentage of the surface that is within a certain range of the average pressure experienced across the surface can also be determined with a pressure sensor having two-dimensional spatial resolution (e.g., a Tekscan 5101 pressure sensor). For example, if the average pressure across the surface is 20 $kg_f/cm^2$ and the pressure sensor determines that the pressure at 90% of the total area of the surface is between 19-21 $kg_f/cm^2$, then 90% of the surface experiences a pressure within 5% of the average pressure across the surface. In this context, the percentages are based on the average pressure (e.g., a measurement of 19 $kg_f/cm^2$ and a measurement of 21 $kg_f/cm^2$ are each within 5% of the average of 20 $kg_f/cm^2$).

In some embodiments, the first anisotropic force and the second anisotropic force with components normal to the surface of the electrochemical cell are applied such that greater than or equal to 50%, greater than or equal to 75%, greater than or equal to 90%, greater than or equal to 95%, greater than or equal to 99%, or more of the surface experiences a pressure that is within 5%, within 2.5%, within 1%, within 0.5%, within 0.1%, or equal to the average pressure across the surface of the electrochemical cell.

Figure 7:
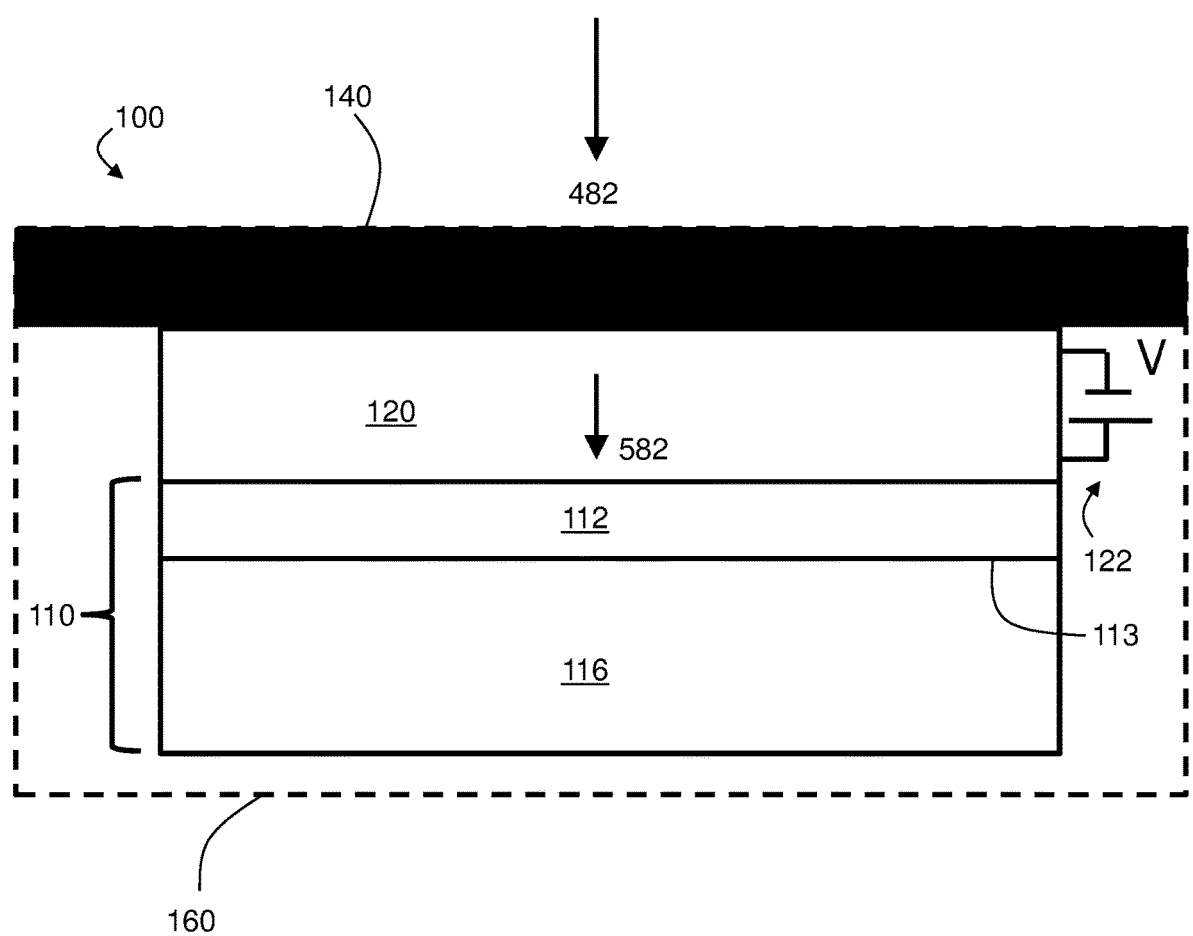
FIG. 7 shows a cross-sectional schematic diagram of an exemplary battery comprising a solid plate, a deformable solid, an electrochemical cell, and an optional housing, according to some embodiments.

In some embodiments, the battery comprises one or more solid plates. In certain such cases, the battery is configured to apply an anisotropic force via a solid plate, the force having a component normal to an active surface of an electrode of the electrochemical cell during at least a portion of a charging and/or discharging. FIG. 7 shows a cross-sectional schematic diagram of battery 100 comprising solid plate 140, according to some embodiments. Battery 100 may be configured to apply anisotropic force component 482 via solid plate 140, anisotropic force component 482 being normal to active surface 113 of anode 112 of electrochemical cell 110. The anisotropic force applied by the solid plate may contribute, at least in part, to a pressure experienced by the electrochemical cell (e.g., during a least a portion of cycling). In some embodiments, the battery comprises multiple solid plates. For example, the battery may comprise a first solid plate and a second solid plate, with the electrochemical cell and deformable solid being between the first solid plate and second solid plate.

In some embodiments, the battery comprises both a solid plate and a deformable solid. For example, battery 100 in FIG. 7 includes deformable solid 120 between solid plate 140 and electrochemical cell 110. In some such embodiments, a pressure sensor is also included (e.g., to initiate signals that may control forces applied by the deformable solid). The battery may comprise, in the order listed: a solid plate, the deformable solid, the pressure sensor, and the electrochemical cell. In FIG. 7, for example, a pressure sensor like pressure sensor 130 shown in FIG. 4 may be between deformable solid 120 and electrochemical cell 110 in some embodiments. It should be understood that other intervening layers or components (e.g., spacers, temperature sensors, etc.) may be present between, for example, the solid plate and the deformable solid, or between the pressure sensor and the electrochemical cell.

In certain embodiments, a pressure experienced by the electrochemical cell is based on contributions both from an anisotropic force applied via the solid plate and from an anisotropic force applied via the deformable solid. Referring again to FIG. 7, electrochemical cell 110 may experience a pressure defined by the combined magnitudes of anisotropic force component 482 applied via solid plate 140 and anisotropic force component 582 applied by at least a portion of deformable solid 120. The application of force by deformable solid 120 may be based at least in part on electrical potential V applied to deformable solid 120 via circuit 122 (e.g., causing a mechanical stress in deformable solid 120).

In some instances, the solid plate applies a relatively large percentage of the force applied to the electrochemical cell, while the deformable solid contributes a magnitude of force chosen to achieve a desired total magnitude of applied anisotropic force. This type of operation may be analogous to a load line with a transistor, with the solid plate setting a pressure "bias point" and the deformable solid (e.g., piezoelectric material, electroactive polymer) adjusting around the bias point to achieve or maintain a desired pressure. The adjustment may be based on measurements, for example, by the pressure sensor.

In some embodiments, the pressure experienced by the electrochemical cell is based on a combined magnitude of anisotropic force contributed by the deformable solid and the solid plate. In some embodiments, the percentage of the pressure resulting from the combined magnitude that is attributable to force applied via the solid plate is greater than or equal to 50%, greater than or equal to 75%, greater than or equal to 90%, greater than or equal to 95%, greater than or equal to 99%, or more. In some embodiments, the percentage of the pressure resulting from the combined magnitude that is attributable to force applied by the deformable solid is greater than or equal to 0.1%, greater than or equal to 1%, greater than or equal to 5%, greater than or equal to 10%, greater than or equal to 20%, and/or up to 50%, or more. The percentage of the pressure resulting from the combined magnitude that is attributable to force applied via the solid plate can be determined by first measuring the pressure experienced by the electrochemical cell as a result of the combined magnitude of anisotropic force—that is, with a load applied to the solid plate and with the electrical potential being applied to the deformable solid. Then, the contribution attributable to the solid plate under these conditions can be determined by measuring the pressure in the absence of any applied electrical potential to the deformable solid, with all other conditions kept the same. Dividing the pressure measurement in the absence of the applied electrical potential by the pressure measurement under the combined magnitude yields the percentage of the pressure resulting combined magnitude that attributable to force applied via the solid plate. Subtracting the percentage applied via the solid plate from 100% yields the percentage attributable to force applied via the deformable solid.

The solid plate may be, for example, an endplate configured to apply an anisotropic force to the electrochemical cell. For example, in FIG. 7, solid plate 140 and is an endplate. It should be understood that the surfaces of a solid plate does not necessarily need to be flat. For example, one of the sides of the solid plate may comprise a surface that is curved (e.g., contoured, convex) in the absence of an applied force. In some embodiments, the solid plate (e.g., an aluminum solid plate) is convex with respect to the electrochemical cells in the absence of an applied force, and under at least one magnitude of applied force the end plate may become less convex (e.g., become flat).

The solid plate may comprise any suitable solid material. In some embodiments, a solid plate is or comprises a metal, metal alloy, composite material, or a combination thereof. In some cases, the metal that the solid plate is or comprises is a transition metal. For example, in some embodiments, the solid plate is or comprises Ti, Cr, Mn, Fe, Co, Ni, Cu, or a combination thereof. In some embodiments, the solid plate is or comprises a non-transition metal. For example, in some embodiments, the solid plate is or comprises Al, Zn, or combinations thereof. Exemplary metal alloys that the solid plate can be or comprise include alloys of aluminum, alloys of iron (e.g., stainless steel), or combinations thereof. Exemplary composite materials that the solid plate can be or comprise include, but are not limited to, reinforced polymeric, metallic, or ceramic materials (e.g., fiber-reinforced composite materials), carbon-containing composites, or combinations thereof.

In some embodiments, a solid plate (e.g., solid plate 140) of the battery comprises carbon fiber. Carbon fiber may be present in the solid plate in a relatively high amount (e.g., greater than or equal to 50 wt %, greater than or equal to 75 wt %, greater than or equal to 90 wt %, greater than or equal to 95 wt %, greater than or equal to 99 wt %, 100 wt %). Carbon fiber can, in some cases, afford relatively high stiffness and/or strength while having a relatively low mass (e.g., by having a relatively low mass density).

In some embodiments, the battery comprises a housing. The housing may at least partially enclose other components of the battery. For example, the housing may at least partially enclose the electrochemical cell and the deformable solid. FIG. 7 shows optional housing 160 at least partially enclosing electrochemical cell 110 and deformable solid 120, according to certain embodiments. The housing may comprise rigid components. As one example, the housing may comprise one or more solid plates. For example, optional housing 160 in FIG. 7 comprises solid plate 140, according to some embodiments. In certain cases, the housing does not comprise a solid plate. For example, in some cases, the solid surfaces and other components of a containment structure configured to house the electrochemical cell and deformable solid are part of a unitary structure.

The housing may comprise couplings that can be used to connect components of the housing and/or apply at least a portion of the anisotropic force. The housing may comprise, for example, couplings proximate to the ends of the housing (e.g., proximate to the ends of the solid plates). A coupling may connect a first solid plate and a second solid plate. In some embodiments, the housing of the battery has more than one coupling. In certain cases, the housing includes at least 2 couplings, at least 4 couplings, and/or up to 8 couplings or more. In some embodiments, the coupling comprises a fastener. The fastener may span from one end of the housing to another. Exemplary fasteners include, but are not limited to, a rod (e.g., a threaded rod, a rod with interlocking features), a bolt, a screw (e.g., a machine screw), a nail, a rivet, a tie, a clip (e.g., a side clip, a circlip), a band, or combinations thereof. In some cases, applying a force via a solid plate comprises causing relative motion between one portion of the coupling (e.g., a nut) and a fastener of the coupling (e.g., by tightening a nut at an interface between the fastener and the solid plate or, in cases where the fastener comprises a machine screw, by turning the machine screw).

In some embodiments, the battery has a relatively small volume. It has been discovered that certain aspects described herein, alone or in combination, such as the deformable solids in combination with pressure sensors and/or solid plates, can allow for relatively high and consistent magnitudes of force, even with a relatively small volume. Having a small volume may allow for the battery to be used in certain applications for which a high volumetric energy density is desirable, such as electric-powered vehicles. In some embodiments, the battery has a volume of less than or equal to 15000 $cm^3$, less than or equal to 13500 $cm^3$, less than or equal to 12000 $cm^3$, less than or equal to 10000 $cm^3$, less than or equal to 8000 $cm^3$, less than or equal to 6750 $cm^3$, less than or equal to 6000 $cm^3$, less than or equal to 5000 $cm^3$, and/or as low as 4000 $cm^3$, or lower.

Figure 8A:
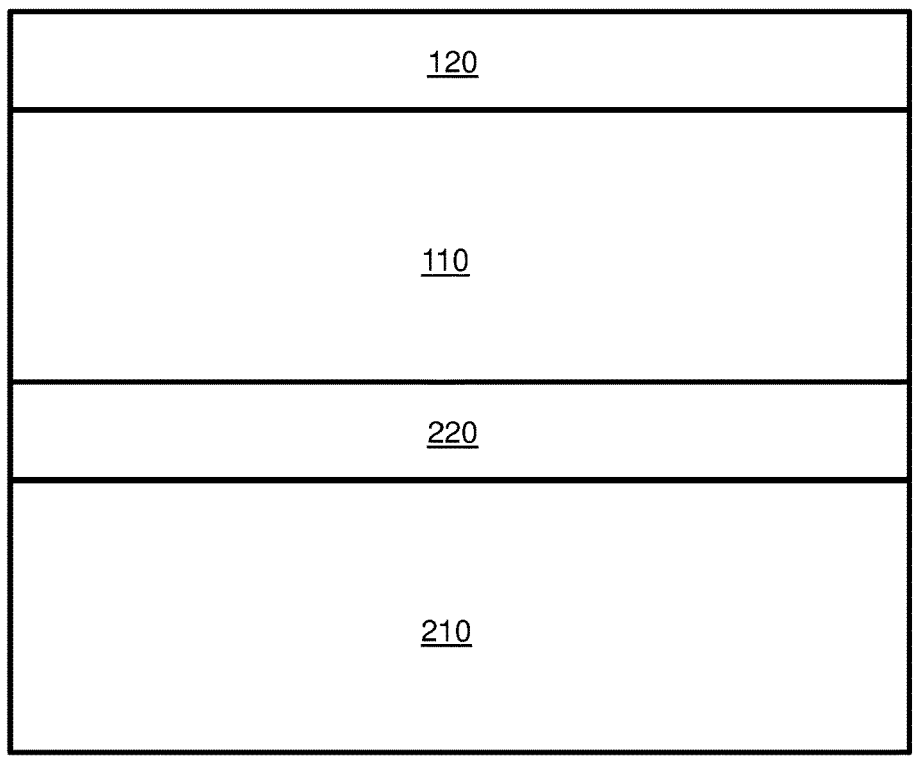
FIGS. 8A-8B show cross-sectional schematic diagrams of exemplary batteries comprising deformable solids and electrochemical cells, according to some embodiments.
Figure 8B:
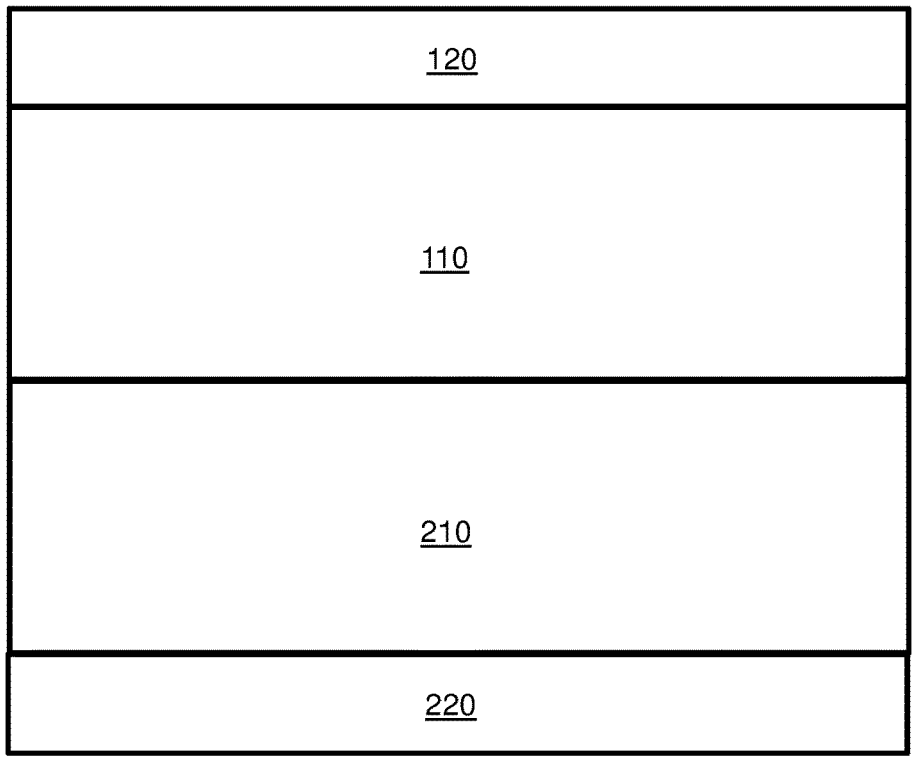

While a single electrochemical cell is illustrated in the batteries shown in FIGS. 1-7, the battery is not limited to having a single electrochemical cell. In some embodiments, the battery comprises multiple electrochemical cells. For example, in some embodiments, the battery comprises a first electrochemical cell and a second electrochemical. In some instances, the battery comprises a first deformable solid associated with the first electrochemical cell and a second deformable solid associated with the second electrochemical cell. For example, FIG. 8A shows a cross-sectional schematic diagram of battery 200A comprising, in the order listed: first deformable solid 120, first electrochemical cell 110, second deformable solid 220, and second electrochemical cell 210. In some instances, the first deformable solid may be configured to apply a first anisotropic force to the first electrochemical cell, and the second deformable solid may be configured to apply a second anisotropic force to the second electrochemical cell. The first anisotropic force and the second anisotropic force may have different magnitudes, and may be applied independently (e.g., via from separate electrical signals). While FIG. 8A shows one possible arrangement, others are possible. For example, FIG. 8B shows a cross-sectional schematic diagram of battery 200B comprising, in the order listed: first deformable solid 120, first electrochemical cell 110, second electrochemical cell 210, and second deformable solid 220.

It has been discovered that application of a consistent pressure to each of multiple electrochemical cells in a battery poses difficulties. As one example, dimensional changes of an electrochemical cell during cycling (e.g., lithium deposition during charging) may be multiplied when more than one electrochemical cell undergoes cycling. This may result in a relatively large total volume or thickness change of the cells in the battery, which can pose challenges to applying a consistent pressure throughout a cycle. Moreover, cells near the center of a stack may experience a different magnitude of pressure than do cells near the edges of the stack in some instances where the anisotropic force is applied using, for example, endplates. The embodiments described in the present disclosure have been discovered to address these potential problems with multi-cell batteries. The deformable solids and methods described herein (e.g., involving pressure sensors) may allow for compensation of electrochemical cell thickness changes during cycling (e.g., by deforming the deformable solid upon mechanical stress induced by an electrical signal). The deformable solids and methods described herein (e.g., involving pressure sensors) may allow for detection of pressure differentials between cells in the interior of the stack and cells near the exterior of the stack (e.g., via pressure sensors in the stack) and apply different anisotropic forces from different deformable solids in the battery accordingly to achieve consistent pressures. The arrangement of the deformable solids and electrochemical cells within the battery may depend, for example, on whether the deformable solid is desired to control pressure distributions throughout multi-cell stack, or whether the deformable is desired to control for thickness changes of the electrochemical cells during cycling.

A battery comprising multiple electrochemical cells may also comprise multiple pressure sensors. For example, the battery may comprise a first pressure sensor associated with the first electrochemical cell and a second pressure sensor associated with the second electrochemical cell. Referring to FIG. 8A, for example, a first pressure sensor like pressure sensor 130 shown in FIG. 4 may be between first deformable solid 120 and first electrochemical cell 110, and a second pressure sensor like pressure sensor 130 may be between second deformable solid 220 and second deformable solid 210. In some embodiments, an electrochemical cell is directly between two pressure sensors, with no intervening layers or components.

It should be understood that while in some embodiments the first electrochemical cell and the second electrochemical cell have the same types of components (e.g., same anode active material, same cathode active material, same type of separator), in other embodiments the first electrochemical cell has one or more different components than the second electrochemical cell (e.g., a different anode active material, a different cathode active material, a different type of separator). In some embodiments, the first electrochemical cell and the second electrochemical cell are identical in composition and/or dimensions.

Figure 9:
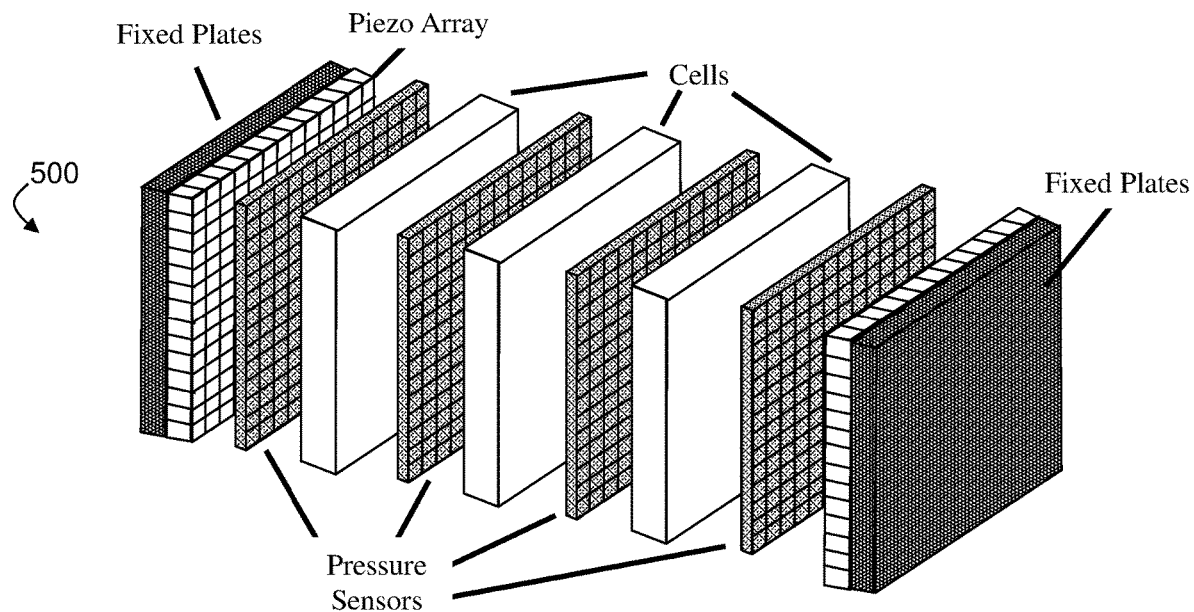
FIG. 9 shows an exploded perspective view schematic diagram of an exemplary battery comprising solid plates, deformable solids, pressure sensors, and electrochemical cells, according to some embodiments.

FIG. 9 shows a non-limiting exploded schematic diagram of one embodiment of a battery comprising a deformable solid associated with an electrochemical cell. Battery 500 comprises two solid plates (each labeled as "Fixed Plate"), inside of which are, in the order listed: a deformable solid comprising an array of independently addressable deformable solid segments each comprising a piezoelectric material (labeled as "Piezo Array"), a pressure sensor comprising an array of pressure sensor segments (labeled as "Pressure Sensor"), an electrochemical cell (labeled as "Cell"), another pressure sensor, another electrochemical cell, another pressure sensor, another electrochemical cell, another pressure sensor, and another deformable solid. One or more the electrochemical cells may comprise lithium metal and/or a lithium metal alloy as an electrode active material during a least a portion of a charge/discharge cycle. Force may be applied to the electrochemical cells via a combination of the fixed plates and the deformable solids, with the force applied by each deformable solid segment being dynamically modulated by pressure measurements from the pressure sensor segments.

Figure 10A:
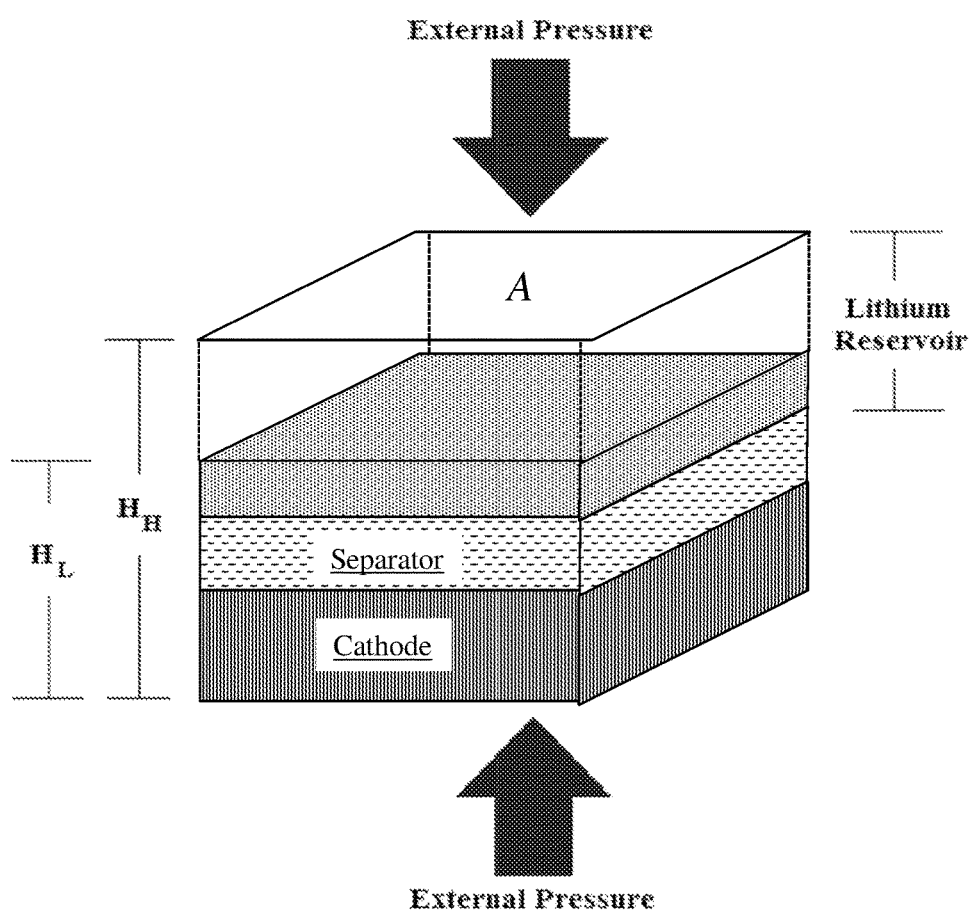
FIGS. 10A-10B show perspective view schematic diagrams of exemplary electrochemical cells, according to some embodiments.
Figure 10B:
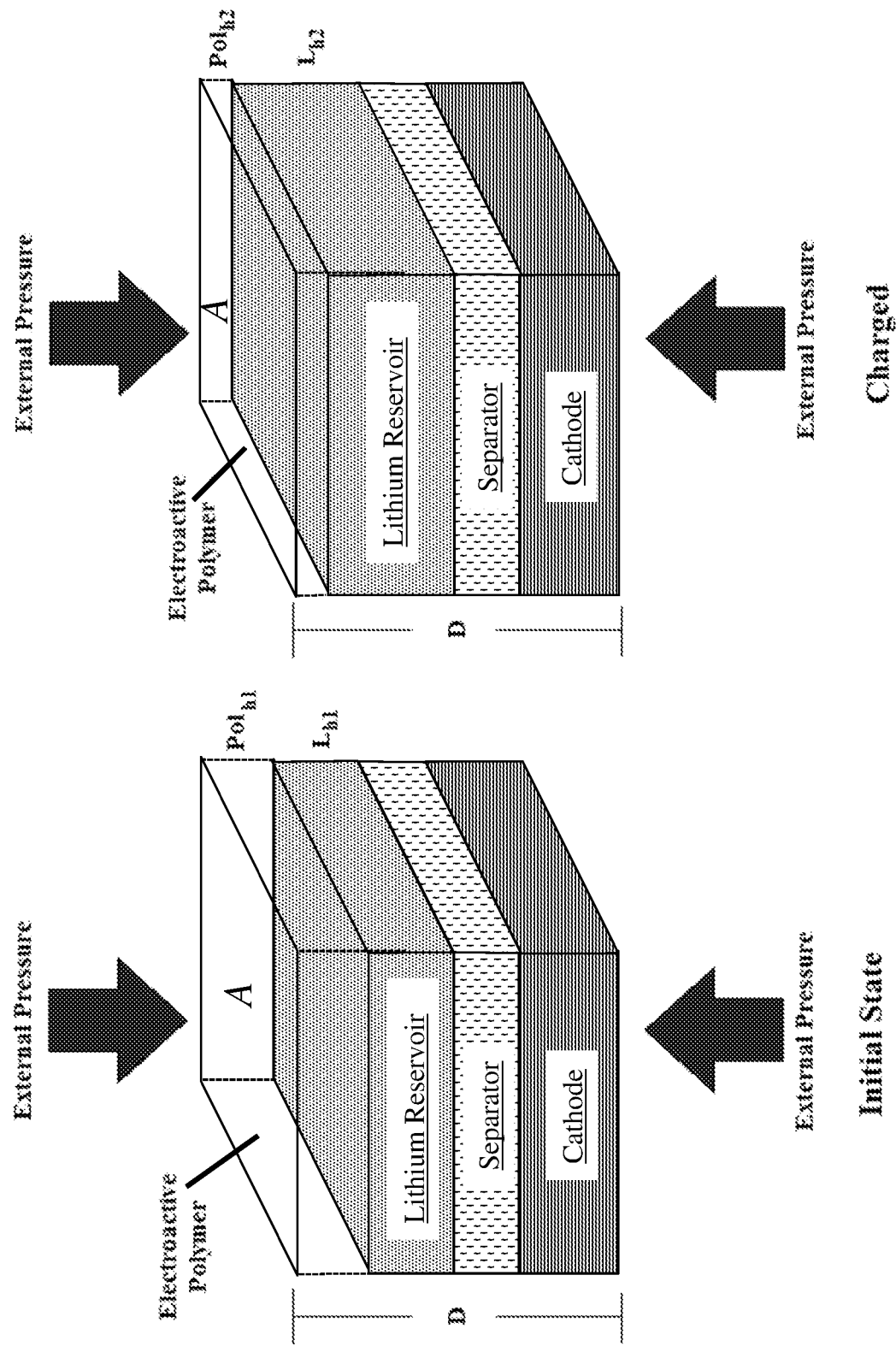
Figure 10C:
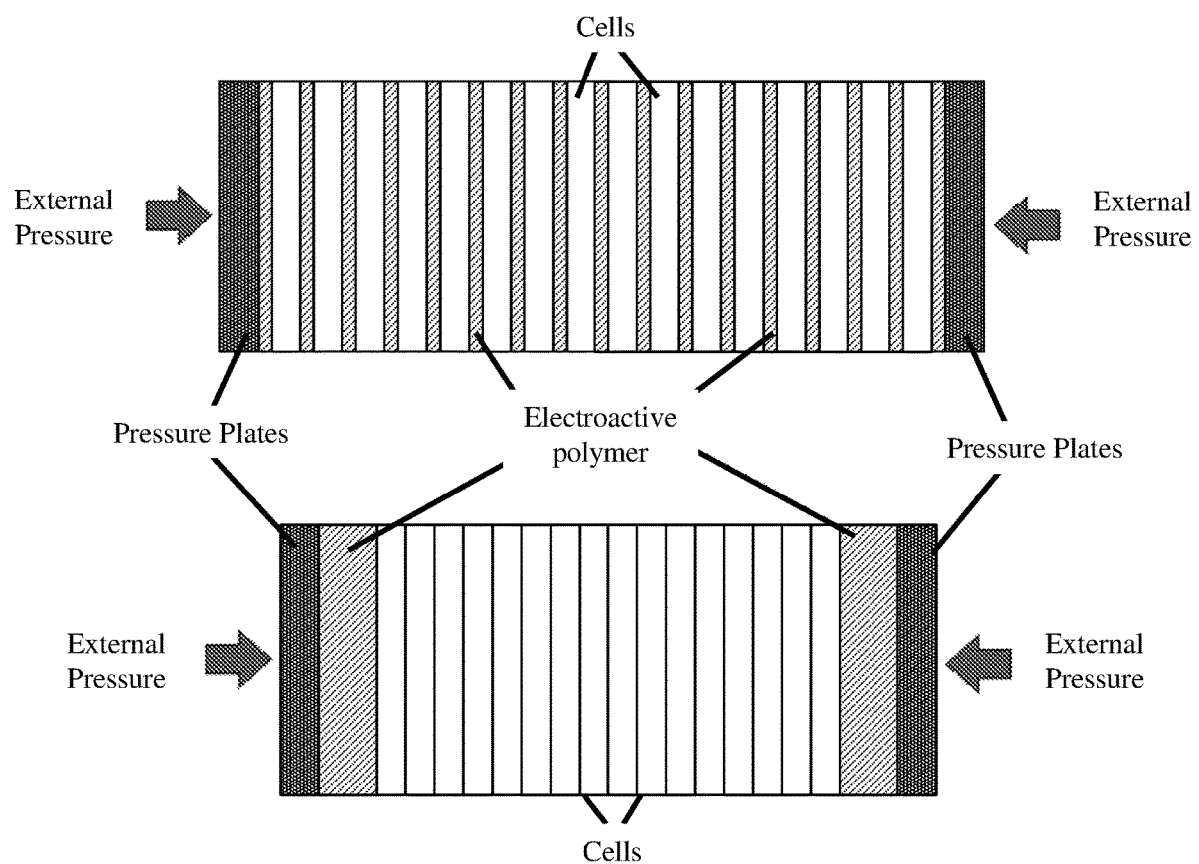
FIG. 10C shows cross-sectional schematic diagram of an exemplary battery comprising solid plates, deformable solids, and electrochemical cells, according to some embodiments.

FIGS. 10A-10C are non-limiting perspective view diagrams of electrochemical cells and batteries relating to the use of deformable solids (e.g., comprising electroactive polymers) to compensate for dimensional changes in the cells during cycling, according to certain embodiments. FIG. 10A shows an electrochemical cell comprising a lithium metal anode. The lithium metal anode shown has an overall thickness change of $H_H-H_L=\Delta H$ during cycling. Compensating for the thickness change, while applying the significant external pressure shown via the arrows in the in the diagram, can in principle be accomplished via systems and methods different than those described herein. However, such alternative methods may be problematic, as explained below.

One alternative method is compensating via a plate and spring arrangement. Under these circumstances the compression and elongation of the spring from a given set point may be sufficient to accommodate the anode thickness change, $\Delta H$, while still maintaining a uniform pressure over the surface area A. While the introduction of such a plate-spring system may be sufficient and relatively straight forward, it suffers from a number of drawbacks. First, it may add substantial weight to the battery system as a whole. Second, spring fatigue may be encountered after long periods of time, and if the system in question is a battery pack comprising multiple cells, substantially stronger springs and plates will be required, adding yet more unwanted weight to the system. More importantly, significant deviation of pressure at the surface may result in an uneven lithium growth rate. This in turn would be magnified on the next cycle creating an even larger pressure difference, and may ultimately causing a premature failure of the cell.

An alternative to the plate and spring arrangement would be to use fixed plates to maintain a selected pressure. Although such an approach may be appealing in terms of simplicity, it suffers from some difficulties. To understand this, one may consider the cell arrangement in FIG. 10A. A bottom fixed plate may be placed underneath the cathode, but the difficulty then lies in where to place the top plate. The top plate cannot be placed at the top of the lithium reservoir (the lithium reservoir full level as denoted by $H_H$). Were this the case, once the reservoir is depleted even to a small extent there would be no force from the solid plate on the system, and in fact a void may appear above the reservoir growing in size to the limit of $\Delta H$. To prevent these voids from appearing above the lithium reservoir, the upper pressure plate would have to be set at $H_L$ (the low reservoir point). One possible problem is that this arrangement may create another set of challenges. When the lithium is plates back, filling the lithium reservoir, it may prove difficult to prevent the lithium from migrating out of the side of the stack (perpendicular to the applied pressure). While it is possible to have side seals made to confine the lithium within the volume of interest, side seals may prove not only prove problematic to install, but questionable in terms of the strength required to prevent the lithium from rupturing the seals and being squeezed out the sides.

The systems and methods described in this disclosure may overcome the limitations of spring and plate and fixed plate-only arrangements. One example is to employ a deformable solid comprising an electroactive polymer layer above the lithium. The electroactive polymer may be inside a housing of the battery, outside the housing, or part of the housing. FIG. 10B assists with understanding one way in which an electroactive polymer deformable layer could be employed in the above fixed plate pressure application. FIG. 10B, left side shows the cell in its initial state waiting to be charged (note that the actual sizes of the components are not to scale). The current lithium reservoir has a height $L_{h1}$, and is capped with an electroactive polymer of initial thickness $Pol_{h1}$. The height of the cell is D, and is fixed with an external pressure applied to both ends of the stack. The cell is then charged, which transfers the lithium in the cathode to the anode. In response, the height of the lithium reservoir increases to $L_{h2}$, as shown in the right side of FIG. 10B. Given that the distance D must remain constant in order to maintain the required external pressure, a voltage is applied to the electroactive polymer, which in turn reduces the polymer's thickness to $Pol_{h2}$. Thus, it can be seen that the thickness of the electroactive polymer can either be decreased or increased to compensate for a change in thickness of the lithium reservoir, which in turn can allow for a fixed distance pressure regime.

The deformable solid comprising the electroactive polymer in the embodiment need not be in the electrochemical cell, but could be attached to the top or bottom of the electrochemical cell, or even to the fixed plate that is part of the external pressure application. In addition, a second deformable solid comprising an electroactive polymer layer may be added to the bottom of the cell or set of cells, which when used in conjunction with a deformable solid comprising an electroactive layer on the top of the cell or set of cells could accommodate an even larger change in the lithium reservoir while still maintaining a fixed cell thickness.

Control of the electroactive polymer may be generated by state of charge conditions, or any other variable that provides insight into the temporal state of the cell. This arrangement may be suitable not only for single cell operations, but multi-cell battery pack operations as well. In embodiments in which the battery comprises multiple electrochemical cells, one or two deformable solids comprising electroactive polymer elements may be placed at the ends or on solid plates of a multi-cell stack to maintain pressure. Another possibility is to insert the deformable solid electroactive polymer elements between each of the cells in a comb-like arrangement. FIG. 10C shows one example of such a comb-like arrangement (top) and of an arrangement where the electroactive polymer elements are at the ends (bottom).

A variety of anode active materials are suitable for use with the anodes of the electrochemical cells described herein, according to certain embodiments. In some embodiments, the anode active material comprises lithium (e.g., lithium metal), such as lithium foil, lithium deposited onto a conductive substrate or onto a non-conductive substrate (e.g., a release layer), and lithium alloys (e.g., lithium-aluminum alloys and lithium-tin alloys). Lithium can be contained as one film or as several films, optionally separated. Suitable lithium alloys for use in the aspects described herein can include alloys of lithium and aluminum, magnesium, silicium (silicon), indium, and/or tin. In some embodiments, the anode active material comprises lithium (e.g., lithium metal and/or a lithium metal alloy) during at least a portion of a charge/discharge cycle of the electrochemical cell.

In some embodiments, the anode active material contains at least 50 wt % lithium. In some cases, the anode active material contains at least 75 wt %, at least 90 wt %, at least 95 wt %, or at least 99 wt % lithium.

In some embodiments, the anode is an electrode from which lithium ions are liberated during discharge and into which the lithium ions are integrated (e.g., intercalated) during charge. In some embodiments, the anode active material is a lithium intercalation compound (e.g., a compound that is capable of reversibly inserting lithium ions at lattice sites and/or interstitial sites). In some embodiments, the anode active material comprises carbon. In certain cases, the anode active material is or comprises a graphitic material (e.g., graphite). A graphitic material generally refers to a material that comprises a plurality of layers of graphene (i.e., layers comprising carbon atoms covalently bonded in a hexagonal lattice). Adjacent graphene layers are typically attracted to each other via van der Waals forces, although covalent bonds may be present between one or more sheets in some cases. In some cases, the carbon-comprising anode active material is or comprises coke (e.g., petroleum coke). In certain embodiments, the anode active material comprises silicon, lithium, and/or any alloys of combinations thereof. In certain embodiments, the anode active material comprises lithium titanate ($Li_4Ti_5O_{12}$, also referred to as "LTO"), tin-cobalt oxide, or any combinations thereof.

A variety of cathode active materials are suitable for use with cathodes of the electrochemical cells described herein, according to certain embodiments. In some embodiments, the cathode active material comprises a lithium intercalation compound (e.g., a compound that is capable of reversibly inserting lithium ions at lattice sites and/or interstitial sites). In certain cases, the cathode active material comprises a layered oxide. A layered oxide generally refers to an oxide having a lamellar structure (e.g., a plurality of sheets, or layers, stacked upon each other). Non-limiting examples of suitable layered oxides include lithium cobalt oxide ($LiCoO_2$), lithium nickel oxide ($LiNiO_2$), and lithium manganese oxide ($LiMnO_2$). In some embodiments, the layered oxide is lithium nickel manganese cobalt oxide ($LiNi_xMn_yCo_zO_2$, also referred to as "NMC" or "NCM"). In some such embodiments, the sum of x, y, and z is 1. For example, a non-limiting example of a suitable NMC compound is $LiNi_{1/3}Mn_{1/3}Co_{1/3}O_2$. In some embodiments, a layered oxide may have the formula $(Li_2MnO_3)_x(LiMO_2)_{(1-x)}$ where M is one or more of Ni, Mn, and Co. For example, the layered oxide may be $(Li_2MnO_3)_{0.25}(LiNi_{0.3}Co_{0.15}Mn_{0.55}O_2)_{0.75}$. In some embodiments, the layered oxide is lithium nickel cobalt aluminum oxide ($LiNi_xCo_yAl_zO_2$, also referred to as "NCA"). In some such embodiments, the sum of x, y, and z is 1. For example, a non-limiting example of a suitable NCA compound is $LiNi_{0.8}Co_{0.15}Al_{0.05}O_2$. In certain embodiments, the cathode active material is a transition metal polyanion oxide (e.g., a compound comprising a transition metal, an oxygen, and/or an anion having a charge with an absolute value greater than 1). A non-limiting example of a suitable transition metal polyanion oxide is lithium iron phosphate ($LiFePO_4$, also referred to as "LFP"). Another non-limiting example of a suitable transition metal polyanion oxide is lithium manganese iron phosphate ($LiMn_xFe_{1-x}PO_4$, also referred to as "LMFP"). A non-limiting example of a suitable LMFP compound is $LiMn_{0.8}Fe_{0.2}PO_4$. In some embodiments, the cathode active material is a spinel (e.g., a compound having the structure $AB_2O_4$, where A can be Li, Mg, Fe, Mn, Zn, Cu, Ni, Ti, or Si, and B can be Al, Fe, Cr, Mn, or V). A non-limiting example of a suitable spinel is a lithium manganese oxide with the chemical formula $LiM_xMn_{2-x}O_4$ where M is one or more of Co, Mg, Cr, Ni, Fe, Ti, and Zn. In some embodiments, x may equal 0 and the spinel may be lithium manganese oxide ($LiMn_2O_4$, also referred to as "LMO"). Another non-limiting example is lithium manganese nickel oxide ($LiNi_xM_{2-x}O_4$, also referred to as "LMNO"). A non-limiting example of a suitable LMNO compound is $LiNi_{0.5}Mn_{1.5}O_4$. In certain cases, the electrode active material of the second electrode comprises $Li_{1.14}Mn_{042}Ni_{0.25}Co_{0.29}O_2$ ("HC-MNC"), lithium carbonate ($Li_2CO_3$), lithium carbides (e.g., $Li_2C_2$, $Li_4C$, $Li_6C_2$, $Li_8C_3$, $Li_6C_3$, $Li_4C_3$, $Li_4C_5$), vanadium oxides (e.g., $V_2O_5$, $V_2O_3$, $V_6O_{13}$), and/or vanadium phosphates (e.g., lithium vanadium phosphates, such as $Li_3V_2(PO_4)_3$), or any combination thereof.

In some embodiments, the cathode active material comprises a conversion compound. For instance, the cathode may be a lithium conversion cathode. It has been recognized that a cathode comprising a conversion compound may have a relatively large specific capacity. Without wishing to be bound by a particular theory, a relatively large specific capacity may be achieved by utilizing all possible oxidation states of a compound through a conversion reaction in which more than one electron transfer takes place per transition metal (e.g., compared to 0.1-1 electron transfer in intercalation compounds). Suitable conversion compounds include, but are not limited to, transition metal oxides (e.g., $Co_3O_4$), transition metal hydrides, transition metal sulfides, transition metal nitrides, and transition metal fluorides (e.g., $CuF_2$, $FeF_2$, $FeF_3$). A transition metal generally refers to an element whose atom has a partially filled d sub-shell (e.g., Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, Rf, Db, Sg, Bh, Hs).

In some cases, the cathode active material may be doped with one or more dopants to alter the electrical properties (e.g., electrical conductivity) of the cathode active material. Non-limiting examples of suitable dopants include aluminum, niobium, silver, and zirconium.

In some embodiments, the cathode active material may be modified by a surface coating comprising an oxide. Non-limiting examples of surface oxide coating materials include: $MgO$, $Al_2O_3$, $SiO_2$, $TiO_2$, $ZnO_2$, $SnO_2$, and $ZrO_2$. In some embodiments, such coatings may prevent direct contact between the cathode active material and the electrolyte, thereby suppressing side reactions.

In certain embodiments, the cathode active material comprises sulfur. In some embodiments, the cathode active material comprises electrode active sulfur-containing materials. "Electrode active sulfur-containing materials," as used herein, refers to electrode active materials which comprise the element sulfur in any form, wherein the electrochemical activity involves the oxidation or reduction of sulfur atoms or moieties. As an example, the electrode active sulfur-containing material may comprise elemental sulfur (e.g., $S_8$). In some embodiments, the electrode active sulfur-containing material comprises a mixture of elemental sulfur and a sulfur-containing polymer. Thus, suitable electrode active sulfur-containing materials may include, but are not limited to, elemental sulfur, sulfides or polysulfides (e.g., of alkali metals) which may be organic or inorganic, and organic materials comprising sulfur atoms and carbon atoms, which may or may not be polymeric. Suitable organic materials include, but are not limited to, those further comprising heteroatoms, conductive polymer segments, composites, and conductive polymers. In some embodiments, an electrode active sulfur-containing material within an electrode (e.g., a cathode) comprises at least 40 wt % sulfur. In some cases, the electrode active sulfur-containing material comprises at least 50 wt %, at least 75 wt %, or at least 90 wt % sulfur.

Examples of sulfur-containing polymers include those described in: U.S. Pat. Nos. 5,601,947 and 5,690,702 to Skotheim et al.; U.S. Pat. Nos. 5,529,860 and 6,117,590 to Skotheim et al.; U.S. Pat. No. 6,201,100 issued Mar. 13, 2001, to Gorkovenko et al., and PCT Publication No. WO 99/33130, each of which is incorporated herein by reference in its entirety for all purposes. Other suitable electrode active sulfur-containing materials comprising polysulfide linkages are described in U.S. Pat. No. 5,441,831 to Skotheim et al.; U.S. Pat. No. 4,664,991 to Perichaud et al., and in U.S. Pat. Nos. 5,723,230, 5,783,330, 5,792,575 and 5,882,819 to Naoi et al., each of which is incorporated herein by reference in its entirety for all purposes. Still further examples of electrode active sulfur-containing materials include those comprising disulfide groups as described, for example in, U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al., each of which is incorporated herein by reference in its entirety for all purposes.

One or more electrodes may further comprise additional additives, such as conductive additives, binders, etc., as described in U.S. Pat. No. 9,034,421 to Mikhaylik et al.; and U.S. Patent Application Publication No. 2013/0316072, each of which is incorporated herein by reference in its entirety for all purposes.

In some embodiments, the electrochemical cell further comprise a separator between two electrode portions (e.g., an anode portion and a cathode portion). The separator may be a solid non-conductive or insulative material which separates or insulates the anode and the cathode from each other preventing short circuiting, and which permits the transport of ions between the anode and the cathode. In some embodiments, the porous separator may be permeable to the electrolyte.

The pores of the separator may be partially or substantially filled with electrolyte. Separators may be supplied as porous, free-standing films which are interleaved with the anodes and the cathodes during the fabrication of cells. Alternatively, the porous separator layer may be applied directly to the surface of one of the electrodes, for example, as described in PCT Publication No. WO 99/33125 to Carlson et al. and in U.S. Pat. No. 5,194,341 to Bagley et al.

A variety of separator materials are known in the art. Examples of suitable solid porous separator materials include, but are not limited to, polyolefins, such as, for example, polyethylenes (e.g., SETELA™ made by Tonen Chemical Corp) and polypropylenes, glass fiber filter papers, and ceramic materials. For example, in some embodiments, the separator comprises a microporous polyethylene film. Further examples of separators and separator materials suitable for use in this invention are those comprising a microporous xerogel layer, for example, a microporous pseudo-boehmite layer, which may be provided either as a free standing film or by a direct coating application on one of the electrodes, as described in U.S. Pat. Nos. 6,153,337 and 6,306,545 by Carlson et al. of the common assignee. Solid electrolytes and gel electrolytes may also function as a separator in addition to their electrolyte function.

As described above, in some embodiments, a force, or forces, is applied to portions of an electrochemical cell (e.g., at least partially from at least a portion of a deformable solid). Such application of force may reduce irregularity or roughening of an electrode surface of the cell (e.g., when lithium metal or lithium alloy anodes are employed), thereby improving performance. Electrochemical devices in which anisotropic forces are applied and methods for applying such forces are described, for example, in U.S. Pat. No. 9,105, 938, issued Aug. 11, 2015, published as U.S. Patent Publication No. 2010/0035128 on Feb. 11, 2010, and entitled "Application of Force in Electrochemical Cells," which is incorporated herein by reference in its entirety for all purposes.

In the embodiments described herein, batteries may undergo a charge/discharge cycle involving deposition of metal (e.g., lithium metal or other active material) on a surface of an anode upon charging and reaction of the metal on the anode surface, wherein the metal diffuses from the anode surface, upon discharging. The uniformity with which the metal is deposited on the anode may affect cell performance. For example, when lithium metal is removed from and/or redeposited on an anode, it may, in some cases, result in an uneven surface. For example, upon redeposition it may deposit unevenly forming a rough surface. The roughened surface may increase the amount of lithium metal available for undesired chemical reactions which may result in decreased cycling lifetime and/or poor cell performance. The application of force to the electrochemical device has been found, in accordance with certain embodiments described herein, to reduce such behavior and to improve the cycling lifetime and/or performance of the cell.

In some embodiments, the battery (e.g., a housing of the battery) is configured to apply, during at least one period of time during charge and/or discharge of the device, an anisotropic force with a component normal to an active surface of an electrode of the electrochemical cell.

In some embodiments, an anisotropic force with a component normal to an active surface of an electrode of the electrochemical cell is applied during at least one period of time during charge and/or discharge of the battery. In some embodiments, the force is applied continuously, over one period of time, or over multiple periods of time that may vary in duration and/or frequency. The anisotropic force may be applied, in some cases, at one or more pre-determined locations, optionally distributed over an active surface of an electrode of the one or more of the electrochemical cells of the battery. In some embodiments, the anisotropic force is applied uniformly over one or more active surfaces of the anode.

An "anisotropic force" is given its ordinary meaning in the art and means a force that is not equal in all directions. A force equal in all directions is, for example, internal pressure of a fluid or material within the fluid or material, such as internal gas pressure of an object. Examples of forces not equal in all directions include forces directed in a particular direction, such as the force on a table applied by an object on the table via gravity. Another example of an anisotropic force includes certain forces applied by a band arranged around a perimeter of an object. For example, a rubber band or turnbuckle can apply forces around a perimeter of an object around which it is wrapped. However, the band may not apply any direct force on any part of the exterior surface of the object not in contact with the band. In addition, when the band is expanded along a first axis to a greater extent than a second axis, the band can apply a larger force in the direction parallel to the first axis than the force applied parallel to the second axis.

A force with a "component normal" to a surface, for example an active surface of an electrode such as an anode, is given its ordinary meaning as would be understood by those of ordinary skill in the art and includes, for example, a force which at least in part exerts itself in a direction substantially perpendicular to the surface. Those of ordinary skill can understand other examples of these terms, especially as applied within the description of this document.

In some embodiments, the anisotropic force can be applied such that the magnitude of the force is substantially equal in all directions within a plane defining a cross-section of the battery, but the magnitude of the forces in out-of-plane directions is substantially unequal to the magnitudes of the in-plane forces.

In one set of embodiments, batteries (e.g., housings) described herein are configured to apply, during at least one period of time during charge and/or discharge of the cell, an anisotropic force with a component normal to an active surface of an electrode of the electrochemical cell. Those of ordinary skill in the art will understand the meaning of this. In such an arrangement, the electrochemical cell may be formed as part of a container which applies at least a portion of such a force by virtue of a "load" applied during or after assembly of the cell, or applied during use of the battery as a result of expansion and/or contraction of one or more components of the battery itself.

The magnitude of the applied force (e.g., applied by the deformable solid, via the solid plate, or a combination thereof) is, in some embodiments, large enough to enhance the performance of the battery. An electrode active surface (e.g., anode active surface) and the anisotropic force may be, in some instances, together selected such that the anisotropic force affects surface morphology of the electrode active surface to inhibit increase in electrode active surface area through charge and discharge and wherein, in the absence of the anisotropic force but under otherwise essentially identical conditions, the electrode active surface area is increased to a greater extent through charge and discharge cycles. "Essentially identical conditions," in this context, means conditions that are similar or identical other than the application and/or magnitude of the force. For example, otherwise identical conditions may mean a battery that is identical, but where it is not constructed (e.g., by couplings such as brackets or other connections) to apply the anisotropic force on the subject battery.

As described herein, in some embodiments, the surface of an anode can be enhanced during cycling (e.g., for lithium, the development of mossy or a rough surface of lithium may be reduced or eliminated) by application of an externally-applied (in some embodiments, uniaxial) pressure. The externally-applied pressure may, in some embodiments, be chosen to be greater than the yield stress of a material forming the anode. For example, for an anode comprising lithium, the cell may be under an externally-applied anisotropic force with a component defining a pressure of at least 10 $kg_f/cm^2$, at least 20 $kg_f/cm^2$, or more. This is because the yield stress of lithium is around 7-8 $kg_f/cm^2$. Thus, at pressures (e.g., uniaxial pressures) greater than this value, mossy Li, or any surface roughness at all, may be reduced or suppressed. The lithium surface roughness may mimic the surface that is pressing against it. Accordingly, when cycling under at least about 10 $kg_f/cm^2$, at least about 20 $kg_f/cm^2$, and/or up 30 $kg_f/cm^2$, up to 40 $kg_f/cm^2$ of externally-applied pressure, the lithium surface may become smoother with cycling when the pressing surface is smooth.

In some cases, one or more forces applied to the cell have a component that is not normal to an active surface of an anode. For example, in FIG. 1A force component 184 is not normal to active surface 113 of anode 112 of electrochemical cell 110. In one set of embodiments, the sum of the components of all applied anisotropic forces in a direction normal to any active surface of an electrode of the battery is larger than any sum of components in a direction that is non-normal to the active surface. In some embodiments, the sum of the components of all applied anisotropic forces in a direction normal to any active surface of an electrode of the battery is at least about 5%, at least about 10%, at least about 20%, at least about 35%, at least about 50%, at least about 75%, at least about 90%, at least about 95%, at least about 99%, or at least about 99.9% larger than any sum of components in a direction that is parallel to the electrode active surface.

In some cases, electrochemical cells may be pre-compressed before they are inserted into housings, and, upon being inserted to the house, they may expand to produce a net force on the electrochemical cells. Such an arrangement may be advantageous, for example, if the electrochemical cells are capable of withstanding relatively high variations in pressure.

As described above, certain embodiments of the inventive systems and/or methods include one or more processors, for example, associated with a pressure sensor. The one or more processes may be associated with or part of a battery control system. The processor may be part of, according to certain embodiments, a computer-implemented control system. The computer-implemented control system can be used to operate various components of the system. In general, any calculation methods, steps, simulations, algorithms, systems, and system elements described herein may be implemented and/or controlled using one or more computer-implemented control system(s), such as the various embodiments of computer-implemented systems described below. The methods, steps, control systems, and control system elements described herein are not limited in their implementation to any specific computer system described herein, as many other different machines may be used.

The computer-implemented control system can be part of or coupled in operative association with one or more articles (e.g., electrochemical cells, deformable solids, pressure sensors) and/or other system components that might be automated, and, in some embodiments, is configured and/or programmed to control and adjust operational parameters, as well as analyze and calculate values, for example any of the values described above. In some embodiments, the computer-implemented control system(s) can send and receive reference signals to set and/or control operating parameters of system apparatus. In other embodiments, the computer-implemented system(s) can be separate from and/or remotely located with respect to the other system components and may be configured to receive data from one or more inventive systems via indirect and/or portable means, such as via portable electronic data storage devices, such as magnetic disks, or via communication over a computer network, such as the Internet or a local intranet.

The computer-implemented control system(s) may include several known components and circuitry, including a processor, a memory system, input and output devices and interfaces (e.g., an interconnection mechanism), as well as other components, such as transport circuitry (e.g., one or more busses), a video and audio data input/output (I/O) subsystem, special-purpose hardware, as well as other components and circuitry, as described below in more detail. Further, the computer system(s) may be a multi-processor computer system or may include multiple computers connected over a computer network.

The computer-implemented control system(s) may include a processor, for example, a commercially available processor such as one of the series x86; Celeron, Pentium, and Core processors, available from Intel; similar devices from AMD and Cyrix; the 680X0 series microprocessors available from Motorola; and the PowerPC microprocessor from IBM. Many other processors are available, and the computer system is not limited to a particular processor.

A processor typically executes a program called an operating system, of which WindowsNT, Windows95 or 98, Windows XP, Windows Vista, Windows 7, Windows 10, UNIX, Linux, DOS, VMS, MacOS, OS8, and OS X are examples, which controls the execution of other computer programs and provides scheduling, debugging, input/output control, accounting, compilation, storage assignment, data management and memory management, communication control and related services. The processor and operating system together define, in accordance with certain embodiments, a computer platform for which application programs in high-level programming languages are written. The computer-implemented control system is not limited to a particular computer platform.

In accordance with certain embodiments, the processor generally manipulates the data within the integrated circuit memory element in accordance with the program instructions and then copies the manipulated data to the non-volatile recording medium after processing is completed. A variety of mechanisms are known for managing data movement between the non-volatile recording medium and the integrated circuit memory element, and the computer-implemented control system(s) that implements the methods, steps, systems control, and system elements control described above is not limited thereto. The computer-implemented control system(s) is not limited to a particular memory system.

At least part of such a memory system described above may be used to store one or more data structures (e.g., look-up tables) or equations such as calibration curve equations. For example, at least part of the non-volatile recording medium may store at least part of a database that includes one or more of such data structures. Such a database may be any of a variety of types of databases, for example, a file system including one or more flat-file data structures where data is organized into data units separated by delimiters, a relational database where data is organized into data units stored in tables, an object-oriented database where data is organized into data units stored as objects, another type of database, or any combination thereof.

It should be appreciated that one or more of any type of computer-implemented control system may be used to implement various embodiments described herein. Aspects of the invention may be implemented in software, hardware or firmware, or any combination thereof. The computer-implemented control system(s) may include specially programmed, special purpose hardware, for example, an application-specific integrated circuit (ASIC). Such special-purpose hardware may be configured to implement one or more of the methods, steps, algorithms, systems control, and/or system elements control described above as part of the computer-implemented control system(s) described above or as an independent component.

The computer-implemented control system(s) and components thereof may be programmable using any of a variety of one or more suitable computer programming languages. In addition, the methods, steps, algorithms, systems control, and/or system elements control may be implemented using any of a variety of suitable programming languages. Such languages may include procedural programming languages, for example, LabView, C, Pascal, Fortran, and BASIC, object-oriented languages, for example, C++, Java, and Eiffel, and other languages, such as a scripting language or even assembly language. In some embodiments, the computer programming language is Python. In some embodiments, the computer programming language is SQL.

Such methods, steps, algorithms, systems control, and/or system elements control, either individually or in combination, may be implemented as a computer program product tangibly embodied as computer-readable signals on a computer-readable medium, for example, a non-volatile recording medium, an integrated circuit memory element, or a combination thereof. For each such method, step, simulation, algorithm, system control, or system element control, such a computer program product may comprise computer-readable signals tangibly embodied on the computer-readable medium that define instructions, for example, as part of one or more programs, that, as a result of being executed by a computer, instruct the computer to perform the method, step, algorithm, system control, and/or system element control.

The following applications are incorporated herein by reference, in their entirety, for all purposes: U.S. Patent Publication No. US 2007/0221265, published on Sep. 27, 2007, filed as application Ser. No. 11/400,781 on Apr. 6, 2006, and entitled "Rechargeable Lithium/Water, Lithium/Air Batteries"; U.S. Patent Publication No. US 2009/

0035646, published on Feb. 5, 2009, filed as application Ser. No. 11/888,339 on Jul. 31, 2007, and entitled "Swelling Inhibition in Batteries"; U.S. Patent Publication No. US 2010/0129699, published on May 17, 2010, filed as application Ser. No. 12/312,674 on Feb. 2, 2010, patented as U.S. Pat. No. 8,617,748 on Dec. 31, 2013, and entitled "Separation of Electrolytes"; U.S. Patent Publication No. US 2010/0291442, published on Nov. 18, 2010, filed as application Ser. No. 12/682,011 on Jul. 30, 2010, patented as U.S. Pat. No. 8,871,387 on Oct. 28, 2014, and entitled "Primer for Battery Electrode"; U.S. Patent Publication No. US 2009/0200986, published on Aug. 31, 2009, filed as application Ser. No. 12/069,335 on Feb. 8, 2008, patented as U.S. Pat. No. 8,264,205 on Sep. 11, 2012, and entitled "Circuit for Charge and/or Discharge Protection in an Energy-Storage Device"; U.S. Patent Publication No. US 2007/0224502, published on Sep. 27, 2007, filed as application Ser. No. 11/400,025 on Apr. 6, 2006, patented as U.S. Pat. No. 7,771,870 on Aug. 10, 2010, and entitled "Electrode Protection in Both Aqueous and Non-Aqueous Electrochemical cells, Including Rechargeable Lithium Batteries"; U.S. Patent Publication No. US 2008/0318128, published on Dec. 25, 2008, filed as application Ser. No. 11/821,576 on Jun. 22, 2007, and entitled "Lithium Alloy/Sulfur Batteries"; U.S. Patent Publication No. US 2002/0055040, published on May 9, 2002, filed as application Ser. No. 09/795,915 on Feb. 27, 2001, patented as U.S. Pat. No. 7,939,198 on May 10, 2011, and entitled "Novel Composite Cathodes, Electrochemical Cells Comprising Novel Composite Cathodes, and Processes for Fabricating Same"; U.S. Patent Publication No. US 2006/0238203, published on Oct. 26, 2006, filed as application Ser. No. 11/111,262 on Apr. 20, 2005, patented as U.S. Pat. No. 7,688,075 on Mar. 30, 2010, and entitled "Lithium Sulfur Rechargeable Battery Fuel Gauge Systems and Methods"; U.S. Patent Publication No. US 2008/0187663, published on Aug. 7, 2008, filed as application Ser. No. 11/728,197 on Mar. 23, 2007, patented as U.S. Pat. No. 8,084,102 on Dec. 27, 2011, and entitled "Methods for Co-Flash Evaporation of Polymerizable Monomers and Non-Polymerizable Carrier Solvent/Salt Mixtures/Solutions"; U.S. Patent Publication No. US 2011/0006738, published on Jan. 13, 2011, filed as application Ser. No. 12/679,371 on Sep. 23, 2010, and entitled "Electrolyte Additives for Lithium Batteries and Related Methods"; U.S. Patent Publication No. US 2011/0008531, published on Jan. 13, 2011, filed as application Ser. No. 12/811,576 on Sep. 23, 2010, patented as U.S. Pat. No. 9,034,421 on May 19, 2015, and entitled "Methods of Forming Electrodes Comprising Sulfur and Porous Material Comprising Carbon"; U.S. Patent Publication No. US 2010/0035128, published on Feb. 11, 2010, filed as application Ser. No. 12/535,328 on Aug. 4, 2009, patented as U.S. Pat. No. 9,105,938 on Aug. 11, 2015, and entitled "Application of Force in Electrochemical Cells"; U.S. Patent Publication No. US 2011/0165471, published on Jul. 15, 2011, filed as application Ser. No. 12/180,379 on Jul. 25, 2008, and entitled "Protection of Anodes for Electrochemical Cells"; U.S. Patent Publication No. US 2006/0222954, published on Oct. 5, 2006, filed as application Ser. No. 11/452,445 on Jun. 13, 2006, patented as U.S. Pat. No. 8,415,054 on Apr. 9, 2013, and entitled "Lithium Anodes for Electrochemical Cells"; U.S. Patent Publication No. US 2010/0239914, published on Sep. 23, 2010, filed as application Ser. No. 12/727,862 on Mar. 19, 2010, and entitled "Cathode for Lithium Battery"; U.S. Patent Publication No. US 2010/0294049, published on Nov. 25, 2010, filed as application Ser. No. 12/471,095 on May 22, 2009, patented as U.S. Pat. No. 8,087,309 on Jan. 3, 2012, and entitled "Hermetic Sample Holder and Method for Performing Microanalysis under Controlled Atmosphere Environment"; U.S. Patent Publication No. US 2011/00765560, published on Mar. 31, 2011, filed as application Ser. No. 12/862,581 on Aug. 24, 2010, and entitled "Electrochemical Cells Comprising Porous Structures Comprising Sulfur"; U.S. Patent Publication No. US 2011/0068001, published on Mar. 24, 2011, filed as application Ser. No. 12/862,513 on Aug. 24, 2010, and entitled "Release System for Electrochemical Cells"; U.S. Patent Publication No. US 2012/0048729, published on Mar. 1, 2012, filed as application Ser. No. 13/216,559 on Aug. 24, 2011, and entitled "Electrically Non-Conductive Materials for Electrochemical Cells"; U.S. Patent Publication No. US 2011/0177398, published on Jul. 21, 2011, filed as application Ser. No. 12/862,528 on Aug. 24, 2010, and entitled "Electrochemical Cell"; U.S. Patent Publication No. US 2011/0070494, published on Mar. 24, 2011, filed as application Ser. No. 12/862,563 on Aug. 24, 2010, and entitled "Electrochemical Cells Comprising Porous Structures Comprising Sulfur"; U.S. Patent Publication No. US 2011/0070491, published on Mar. 24, 2011, filed as application Ser. No. 12/862,551 on Aug. 24, 2010, and entitled "Electrochemical Cells Comprising Porous Structures Comprising Sulfur"; U.S. Patent Publication No. US 2011/0059361, published on Mar. 10, 2011, filed as application Ser. No. 12/862,576 on Aug. 24, 2010, patented as U.S. Pat. No. 9,005,009 on Apr. 14, 2015, and entitled "Electrochemical Cells Comprising Porous Structures Comprising Sulfur"; U.S. Patent Publication No. US 2012/0070746, published on Mar. 22, 2012, filed as application Ser. No. 13/240,113 on Sep. 22, 2011, and entitled "Low Electrolyte Electrochemical Cells"; U.S. Patent Publication No. US 2011/0206992, published on Aug. 25, 2011, filed as application Ser. No. 13/033,419 on Feb. 23, 2011, and entitled "Porous Structures for Energy Storage Devices"; U.S. Patent Publication No. 2013/0017441, published on Jan. 17, 2013, filed as application Ser. No. 13/524,662 on Jun. 15, 2012, patented as U.S. Pat. No. 9,548,492 on Jan. 17, 2017, and entitled "Plating Technique for Electrode"; U.S. Patent Publication No. US 2013/0224601, published on Aug. 29, 2013, filed as application Ser. No. 13/766,862 on Feb. 14, 2013, patented as U.S. Pat. No. 9,077,041 on Jul. 7, 2015, and entitled "Electrode Structure for Electrochemical Cell"; U.S. Patent Publication No. US 2013/0252103, published on Sep. 26, 2013, filed as application Ser. No. 13/789,783 on Mar. 8, 2013, patented as U.S. Pat. No. 9,214,678 on Dec. 15, 2015, and entitled "Porous Support Structures, Electrodes Containing Same, and Associated Methods"; U.S. Patent Publication No. US 2013/0095380, published on Apr. 18, 2013, filed as application Ser. No. 13/644,933 on Oct. 4, 2012, patented as U.S. Pat. No. 8,936,870 on Jan. 20, 2015, and entitled "Electrode Structure and Method for Making the Same"; U.S. Patent Publication No. US 2014/0123477, published on May 8, 2014, filed as application Ser. No. 14/069,698 on Nov. 1, 2013, patented as U.S. Pat. No. 9,005,311 on Apr. 14, 2015, and entitled "Electrode Active Surface Pretreatment"; U.S. Patent Publication No. US 2014/0193723, published on Jul. 10, 2014, filed as application Ser. No. 14/150,156 on Jan. 8, 2014, patented as U.S. Pat. No. 9,559,348 on Jan. 31, 2017, and entitled "Conductivity Control in Electrochemical Cells"; U.S. Patent Publication No. US 2014/0255780, published on Sep. 11, 2014, filed as application Ser. No. 14/197,782 on Mar. 5, 2014, patented as U.S. Pat. No. 9,490,478 on Nov. 6, 2016, and entitled "Electrochemical Cells Comprising Fibril Materials"; U.S. Patent Publication No. US 2014/0272594, published on Sep. 18, 2014, filed as application Ser. No. 13/833,377 on Mar. 15, 2013, and entitled "Protective Structures for Electrodes"; U.S. Patent Publication No. US 2014/0272597, published on Sep. 18, 2014, filed as application Ser. No. 14/209,274 on Mar. 13, 2014, and entitled "Protected Electrode Structures and Methods"; U.S. Patent Publication No. US 2014/0193713, published on Jul. 10, 2014, filed as application Ser. No. 14/150,196 on Jan. 8, 2014, patented as U.S. Pat. No. 9,531,009 on Dec. 27, 2016, and entitled "Passivation of Electrodes in Electrochemical Cells"; U.S. Patent Publication No. US 2014/0272565, published on Sep. 18, 2014, filed as application Ser. No. 14/209,396 on Mar. 13, 2014, and entitled "Protected Electrode Structures"; U.S. Patent Publication No. US 2015/0010804, published on Jan. 8, 2015, filed as application Ser. No. 14/323,269 on Jul. 3, 2014, and entitled "Ceramic/Polymer Matrix for Electrode Protection in Electrochemical Cells, Including Rechargeable Lithium Batteries"; U.S. Patent Publication No. US 2015/044517, published on Feb. 12, 2015, filed as application Ser. No. 14/455,230 on Aug. 8, 2014, and entitled "Self-Healing Electrode Protection in Electrochemical Cells"; U.S. Patent Publication No. US 2015/0236322, published on Aug. 20, 2015, filed as application Ser. No. 14/184,037 on Feb. 19, 2014, and entitled "Electrode Protection Using Electrolyte-Inhibiting Ion Conductor"; and U.S. Patent Publication No. US 2016/0072132, published on Mar. 10, 2016, filed as application Ser. No. 14/848,659 on Sep. 9, 2015, and entitled "Protective Layers in Lithium-Ion Electrochemical Cells and Associated Electrodes and Methods".

U.S. Provisional Application No. 62/989,009, filed Mar. 13, 2020, and entitled "Application of Pressure to Electrochemical Devices Including Deformable Solids, and Related Systems," is incorporated herein by reference in its entirety for all purposes.

It should be understood that when a portion (e.g., layer, structure, region) is "on", "adjacent", "above", "over", "overlying", or "supported by" another portion, it can be directly on the portion, or an intervening portion (e.g., layer, structure, region) also may be present. Similarly, when a portion is "below" or "underneath" another portion, it can be directly below the portion, or an intervening portion (e.g., layer, structure, region) also may be present. A portion that is "directly on", "directly adjacent", "immediately adjacent", "in direct contact with", or "directly supported by" another portion means that no intervening portion is present. It should also be understood that when a portion is referred to as being "on", "above", "adjacent", "over", "overlying", "in contact with", "below", or "supported by" another portion, it may cover the entire portion or a part of the portion.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A battery, comprising:
   an electrochemical cell;
   a deformable solid associated with the electrochemical cell, the deformable solid configured to apply an anisotropic force with a component normal to an active surface of an electrode of the electrochemical cell;
   a pressure sensor that is different than the deformable solid, the pressure sensor comprising a two-dimensional array of independently addressable pressure sensor segments including a first pressure sensor segment associated with a first region of a surface of the electrochemical cell and a second pressure sensor segment associated with a second region of the surface; and
   a battery control system,
   wherein at least a portion of the deformable solid is configured to experience a mechanical stress affecting a magnitude of the anisotropic force upon the application of an electrical potential to the deformable solid, and
   wherein the deformable solid comprises a two-dimensional array of independently addressable deformable solid segments, including a first independently addressable deformable solid segment associated with the first region and a second independently addressable deformable solid segment associated with the second region, each of which is configured to experience a mechanical stress upon the application of an electrical potential to that deformable solid segment,
   wherein the battery control system is configured to change an electrical potential applied to the first independently addressable deformable solid segment, at least in part, in response to an electrical signal generated by the first independently addressable pressure sensor segment indicative of a pressure measurement at the first region, such that a magnitude of anisotropic force applied to the first region is changed, and
   wherein the battery control system is configured to change an electrical potential applied to the second independently addressable deformable solid segment, at least in part, in response to an electrical signal generated by the second independently addressable pressure sensor segment indicative of a pressure measurement at the second region and that is independent of any electrical signal generated by the first independently addressable pressure sensor segment, such that a magnitude of anisotropic force applied to the second region is changed.

2. The battery of claim 1, wherein the mechanical stress causes the at least a portion of the deformable solid to expand.

3. The battery of claim 1, wherein the mechanical stress causes the at least a portion of the deformable solid to contract.

4. The battery of claim 1, wherein the deformable solid comprises a piezoelectric material.

5. The battery of claim 1, wherein the deformable solid comprises an electroactive polymer.

6. The battery of claim 1, wherein the change in the electrical potential applied to the first independently addressable deformable solid segment is, at least in part, in response to and/or simultaneous with a change in at least one dimension of the electrochemical cell.

7. The battery of claim 1, wherein the battery comprises, in the order listed:
   a solid plate,
   the deformable solid,
   the pressure sensor, and
   the electrochemical cell.

8. The battery of claim 1, wherein at least one electrode of the electrochemical cell comprises lithium metal and/or a lithium metal alloy as an electrode active material during at least a portion of a charge/discharge cycle.

9. The battery of claim 1, wherein the battery is configured to apply, during at least one period of time during charge and/or discharge of the electrochemical cell, a total anisotropic force with a component normal to the active surface of the electrode of the electrochemical cell defining a pressure of at least 10 $kg_f/cm^2$.

10. The battery of claim 1, wherein the two-dimensional array of independently addressable deformable solid segments comprises a two-dimensional grid of at least three columns of independently addressable deformable solid segments and at least three rows of independently addressable deformable solid segments.

11. The battery of claim 1, wherein:
    the deformable solid comprises a piezoelectric material;
    the electrode comprises lithium metal and/or a lithium metal alloy as an electrode active material during at least a portion of a charge/discharge cycle;
    the battery is configured to apply, during at least one period of time during charge and/or discharge of the electrochemical cell, a total anisotropic force with a component normal to the active surface of the electrode of the electrochemical cell defining a pressure of at least 10 $kg_f/cm^2$; and
    the two-dimensional array of independently addressable deformable solid segments comprises a two-dimensional grid of at least three columns of independently addressable deformable solid segments and at least three rows of independently addressable deformable solid segments.

12. An electric-powered vehicle comprising the battery of claim 1.

13. A method, comprising:
    applying an electrical potential to a first independently addressable deformable solid segment of a deformable solid associated with an electrochemical cell, the deformable solid comprising a two-dimensional array of independently addressable deformable solid segments that includes the first independently addressable deformable solid segment and a second independently addressable deformable solid segment, such that:
    the first independently addressable deformable solid segment experiences a mechanical stress, and
    the at least a portion of the first independently addressable deformable solid segment applies a first anisotropic force to a first region of a surface of the electrochemical cell, the force having a component normal to an active surface of an electrode of the electrochemical cell;

changing the electrical potential applied to the first independently addressable deformable solid segment, at least in part, in response to an electrical signal received from a first independently addressable pressure sensor segment indicative of a pressure measurement at the first region of the surface, the first independently addressable pressure sensor segment and a second independently addressable pressure sensor segment being part of a two-dimensional array of independently addressable pressure sensor segments of a pressure sensor that is different than the deformable solid, such that:

the mechanical stress experienced by the first independently addressable deformable solid segment changes, and the first independently addressable deformable solid segment applies a second anisotropic force to the first region of the surface, the second anisotropic force applied to the first region having a component normal to the active surface having a magnitude that is different than that of the first anisotropic force applied to the first region or is zero;

applying an electrical potential to the second independently addressable deformable solid segment such that:

the second independently addressable deformable solid segment experiences a mechanical stress, and the second independently addressable deformable solid segment applies a first anisotropic force to a second region of the surface of the electrochemical cell, the first anisotropic force applied to the second region having a component normal to the active surface of the electrode; and changing the electrical potential applied to the second independently addressable deformable solid segment, at least in part, in response to an electrical signal received from the second independently addressable pressure sensor segment indicative of a pressure measurement at the second region of the surface and that is independent of the electrical signal from the first independently addressable pressure sensor segment, such that:

the mechanical stress experienced by the second independently addressable deformable solid segment changes, and the second independently addressable deformable solid segment applies a second anisotropic force to the second region of the surface, the second anisotropic force applied to the second region having a component normal to the active surface having a magnitude that is different than that of the first anisotropic force applied to the second region or is zero.

14. The method of claim 13, wherein the mechanical stress experienced by the first independently addressable deformable solid segment causes the first independently addressable deformable solid segment to expand.

15. The method of claim 13, wherein the mechanical stress experienced by the first independently addressable deformable solid causes the first independently addressable deformable solid segment to contract.

16. The method of claim 13, wherein the changing the electrical potential applied to the first independently addressable deformable solid segment is, at least in part, in response to and/or simultaneous with a change in at least one dimension of the electrochemical cell.

17. The method of claim 13, wherein the deformable solid comprises a piezoelectric material.

18. The method of claim 13, wherein the deformable solid comprises an electroactive polymer.

19. The method of claim 13, wherein at least one electrode of the electrochemical cell comprises lithium metal and/or a lithium metal alloy as an electrode active material during at least a portion of a charge/discharge cycle.

20. The method of claim 13, further comprising:
charging and/or discharging the electrochemical cell; and
applying, during at least one period of time during the charging and/or discharging, a total anisotropic force with a component normal to the active surface of the electrode of the electrochemical cell defining a pressure of at least 10 $kg_f/cm^2$.

21. The method of claim 13, wherein the two-dimensional array of independently addressable deformable solid segments comprises a two-dimensional grid of at least three columns of independently addressable deformable solid segments and at least three rows of independently addressable deformable solid segments.

22. The method of claim 13, wherein:
the deformable solid comprises a piezoelectric material;
the method further comprises charging and/or discharging the electrochemical cell;
the electrode comprises lithium metal and/or a lithium metal alloy as an electrode active material during at least a portion of the charging and/or discharging;
the method further comprises applying, during at least one period of time during the charging and/or discharging, a total anisotropic force with a component normal to the active surface of the electrode of the electrochemical cell defining a pressure of at least 10 $kg_f/cm^2$; and
the two-dimensional array of independently addressable deformable solid segments comprises a two-dimensional grid of at least three columns of independently addressable deformable solid segments and at least three rows of independently addressable deformable solid segments.

23. A method, comprising:
applying a first anisotropic force to a first region of a surface of an electrochemical cell based at least in part on a first electrical signal received from a first independently addressable pressure sensor segment indicative of a pressure measurement at the first region of the surface, the first independently addressable pressure sensor segment and a second independently addressable pressure sensor segment being part of a two-dimensional array of independently addressable pressure sensor segments of a pressure sensor, the first anisotropic force having a component normal to the surface; and
applying a second anisotropic force to a second region of the surface based at least in part on a second electrical signal received from the second independently addressable pressure sensor segment indicative of a pressure measurement at the second region of the surface and that is independent of the first electrical signal, the second anisotropic force having a component normal to the surface,
wherein:
the first anisotropic force is applied via a first independently addressable deformable solid segment, the first independently addressable deformable solid segment and a second independently addressable deformable solid segment being part of a two-dimensional array of independently addressable deformable solid segments of a deformable solid that is different than the pressure sensor; and the second anisotropic force is applied via the second independently addressable deformable solid segment.

24. The method of claim 23, wherein the applying the second anisotropic force occurs during a least a portion of the time the applying the first anisotropic force occurs.

25. The method of claim 23, wherein the deformable solid comprises a piezoelectric material.

26. The method of claim 23, wherein the deformable solid comprises an electroactive polymer.

27. The method of claim 23, wherein the first anisotropic force and the second anisotropic force are applied such that a pressure experienced by the first region of the surface is within 5% of a pressure experienced by the second region of the surface.

28. The method of claim 23, wherein the first anisotropic force and the second anisotropic force are applied such that greater than or equal to 50% of the surface experiences a pressure that is within 5% of the average pressure across the surface.

29. The method of claim 23, wherein at least one electrode of the electrochemical cell comprises lithium metal and/or a lithium metal alloy as an electrode active material during at least a portion of a charge/discharge cycle.

30. The method of claim 23, further comprising:
charging and/or discharging the electrochemical cell; and
applying, during at least one period of time during the charging and/or discharging, a total anisotropic force with a component normal to the active surface of the electrode of the electrochemical cell defining a pressure of at least 10 $kg_f/cm^2$.

31. The method of claim 23, wherein the two-dimensional array of independently addressable deformable solid segments comprises a two-dimensional grid of at least three columns of independently addressable deformable solid segments and at least three rows of independently addressable deformable solid segments.

32. The method of claim 23, wherein:
the deformable solid comprises a piezoelectric material;
the method further comprises charging and/or discharging an electrode of the electrochemical cell;
the electrode comprises lithium metal and/or a lithium metal alloy as an electrode active material during at least a portion of the charging and/or discharging;
the method further comprises applying, during at least one period of time during the charging and/or discharging, a total anisotropic force with a component normal to an active surface of the electrode of the electrochemical cell defining a pressure of at least 10 $kg_f/cm^2$; and
the two-dimensional array of independently addressable deformable solid segments comprises a two-dimensional grid of at least three columns of independently addressable deformable solid segments and at least three rows of independently addressable deformable solid segments.

* * * * *

UNITED STATES PATENT AND TRADEMARK OFFICE
CERTIFICATE OF CORRECTION

| | |
|---|---|
| PATENT NO. | : 11,923,495 B2 |
| APPLICATION NO. | : 17/911080 |
| DATED | : March 5, 2024 |
| INVENTOR(S) | : Michael G. Laramie et al. |

It is certified that error appears in the above-identified patent and that said Letters Patent is hereby corrected as shown below:

In the Claims

In Claim 13 at Column 38, Line 62, "the at least a portion of the first independently" should read --the first independently--

Signed and Sealed this
Seventh Day of May, 2024

Katherine Kelly Vidal
Director of the United States Patent and Trademark Office